United States Patent
Joseph

(10) Patent No.: US 9,908,062 B2
(45) Date of Patent: *Mar. 6, 2018

(54) EXTRACTION APPARATUS AND METHOD

(71) Applicant: Andrew Paul Joseph, Johnstown, OH (US)

(72) Inventor: Andrew Paul Joseph, Johnstown, OH (US)

( * ) Notice: Subject to any disclaimer, the term of this patent is extended or adjusted under 35 U.S.C. 154(b) by 228 days.

This patent is subject to a terminal disclaimer.

(21) Appl. No.: 14/827,415

(22) Filed: Aug. 17, 2015

(65) Prior Publication Data

US 2016/0228789 A1 Aug. 11, 2016

Related U.S. Application Data

(63) Continuation-in-part of application No. 14/085,682, filed on Nov. 20, 2013, now Pat. No. 9,132,363.
(Continued)

(51) Int. Cl.
*B01D 29/66* (2006.01)
*B01D 11/02* (2006.01)
(Continued)

(52) U.S. Cl.
CPC ...... *B01D 11/0203* (2013.01); *B01D 11/0207* (2013.01); *B01D 11/028* (2013.01);
(Continued)

(58) Field of Classification Search
CPC ............ B01D 11/0484; B01D 11/0488; B01D 11/0492; B01D 11/028; B01D 11/0284;
(Continued)

(56) References Cited

U.S. PATENT DOCUMENTS 2,148,460 A * 2/1939 Haney .................. B01D 11/043
422/256
2,270,827 A * 1/1942 Tijmstra ............. B01D 11/0488
208/317
(Continued)

FOREIGN PATENT DOCUMENTS

CN 2393612 Y 8/2000
CN 1284396 A 2/2001
(Continued)

OTHER PUBLICATIONS

The International Search Report and the Written Opinion of the International Searching Authority, dated Mar. 25, 2014, ISA/USPTO as PCT receiving office.

*Primary Examiner* — Joseph Drodge

(57) ABSTRACT

A fractional extraction apparatus comprises one or more extraction vessel configured to receive a process fluid, allow the process fluid to come into contact with a source material within the extraction vessel under either of a selectively configured first predetermined pressure and a first predetermined temperature to remove a first predetermined extracted material from the source material to form a first mixture or a second predetermined pressure and a second predetermined temperature to remove a second predetermined extracted material from the source material to form a second mixture. The apparatus further comprises one or more separation chamber and a circulation conduit, the conduit including a separation portion configured to receive the first or second mixture and permit a portion of the first or second predetermined extracted material to separate from the mixture within the separation chamber. The apparatus further comprises a temperature regulator configured to regulate the temperature of the process fluid during extraction. The apparatus further comprises a thermal manager configured to regulate the temperature of the process fluid during recir-
(Continued)

culation. The apparatus further comprises one or more filter plugs configured to retain a filter at the opening of the extraction vessel.

24 Claims, 16 Drawing Sheets

Related U.S. Application Data

(60) Provisional application No. 61/799,665, filed on Mar. 15, 2013, provisional application No. 61/728,656, filed on Nov. 20, 2012.

(51) Int. Cl.
| | |
|---|---|
| *B01D 17/12* | (2006.01) |
| *B01D 35/12* | (2006.01) |
| *B01D 36/04* | (2006.01) |
| *C11B 11/00* | (2006.01) |
| *B01D 11/04* | (2006.01) |
| *C11B 1/10* | (2006.01) |
| *B01D 11/00* | (2006.01) |

(52) U.S. Cl.
CPC ...... *B01D 11/0284* (2013.01); *B01D 11/0288* (2013.01); *B01D 11/04* (2013.01); *B01D 11/0403* (2013.01); *B01D 11/0407* (2013.01); *B01D 11/0484* (2013.01); *B01D 11/0488* (2013.01); *B01D 11/0492* (2013.01); *B01D 29/66* (2013.01); *B01D 36/04* (2013.01); *C11B 1/104* (2013.01); *B01D 2011/007* (2013.01)

(58) Field of Classification Search
CPC ............ B01D 11/0288; B01D 11/0403; B01D 11/0407; B01D 2011/007; B01D 29/66; B01D 29/0079; B01D 35/12; B01D 17/02; B01D 17/0208; B01D 17/12; B01D 21/30; B01D 36/02; B01D 36/04; C11B 1/10; C11B 1/102; C11B 1/104; C11B 1/108; C11B 3/006; C11B 7/005; C11B 7/0008; C02F 1/001; C02F 1/006; C02F 1/008; C02F 1/26; C02F 9/00; C02F 2209/02; C02F 2209/03

USPC ....... 210/149, 175, 182, 259, 511, 634, 639, 210/806, 257.1, 257.2, 333.01, 333.1, 210/411, 798; 422/256, 260; 554/8, 11, 554/16

See application file for complete search history.

(56) References Cited

U.S. PATENT DOCUMENTS

| | | | | |
|---|---|---|---|---|
| 2,505,139 | A | * | 4/1950 | Pascal ............... C11B 1/102 |
| | | | | 417/569 |
| 3,367,034 | A | * | 2/1968 | Good ................. C11B 1/108 |
| | | | | 219/629 |
| 3,410,705 | A | * | 11/1968 | Honma ............. C04B 35/4684 |
| | | | | 361/321.5 |
| 3,577,341 | A | * | 5/1971 | Keith ................ B01D 21/0012 |
| | | | | 210/195.1 |
| 3,918,859 | A | | 11/1975 | Dugan et al. |
| 4,548,755 | A | | 10/1985 | Stahl et al. |
| 4,675,133 | A | | 6/1987 | Eggers et al. |
| 4,898,673 | A | | 2/1990 | Rice et al. |
| 4,962,275 | A | | 10/1990 | Bruno |
| 5,252,729 | A | | 10/1993 | De Crosta et al. |
| 5,267,455 | A | | 12/1993 | Dewees et al. |
| 5,472,612 | A | | 12/1995 | Maxwell |
| 5,614,089 | A | * | 3/1997 | Allington .......... B01D 11/0203 |
| | | | | 210/198.2 |
| 5,653,884 | A | * | 8/1997 | Smart ............... B01D 11/0203 |
| | | | | 210/175 |
| 5,750,027 | A | | 5/1998 | Allington et al. |
| 5,795,594 | A | | 8/1998 | York et al. |
| 6,326,504 | B1 | | 12/2001 | Piquer et al. |
| 6,799,587 | B2 | | 10/2004 | Marshall et al. |
| 7,335,296 | B2 | | 2/2008 | Arai et al. |
| 8,119,419 | B2 | | 2/2012 | Stroup |
| 8,778,181 | B1 | | 7/2014 | Johnson et al. |
| 9,132,363 | B2 | * | 9/2015 | Joseph .............. B01D 11/0203 |
| 2004/0107901 | A1 | | 6/2004 | Del Re et al. |
| 2005/0139552 | A1 | * | 6/2005 | Forsberg ................ E03B 3/28 |
| | | | | 62/635 |
| 2006/0153757 | A1 | | 7/2006 | Cooper et al. |
| 2010/0151098 | A1 | | 6/2010 | Catchpole et al. |
| 2012/0125444 | A1 | * | 5/2012 | Tipler .................. G01N 30/40 |
| | | | | 137/14 |

FOREIGN PATENT DOCUMENTS

| | | |
|---|---|---|
| CN | 1548206 A | 11/2004 |
| CN | 1919232 A | 2/2007 |
| CN | 202128943 U | 2/2012 |

* cited by examiner

EXTRACTION APPARATUS AND METHOD

CROSS-REFERENCE TO RELATED APPLICATION

This continuation-in-part application claims priority to and claims the benefit of U.S. Non-Provisional application Ser. No. 14/085,682 filed Nov. 20, 2013, now U.S. Pat. No. 9,132,363, entitled "Extraction system", U.S. Provisional Patent Application Ser. No. 61/799,665 filed Mar. 15, 2013, entitled "Fluid extraction system and method", and U.S. Provisional Patent Application Ser. No. 61/728,656 filed Nov. 20, 2012, entitled "Fluid extraction system and method," each of which is incorporated by reference in its entirety as if fully set forth herein.

FIELD

The disclosed apparatuses and methods relate generally to the field of fluid extraction.

SUMMARY

Figure 1:
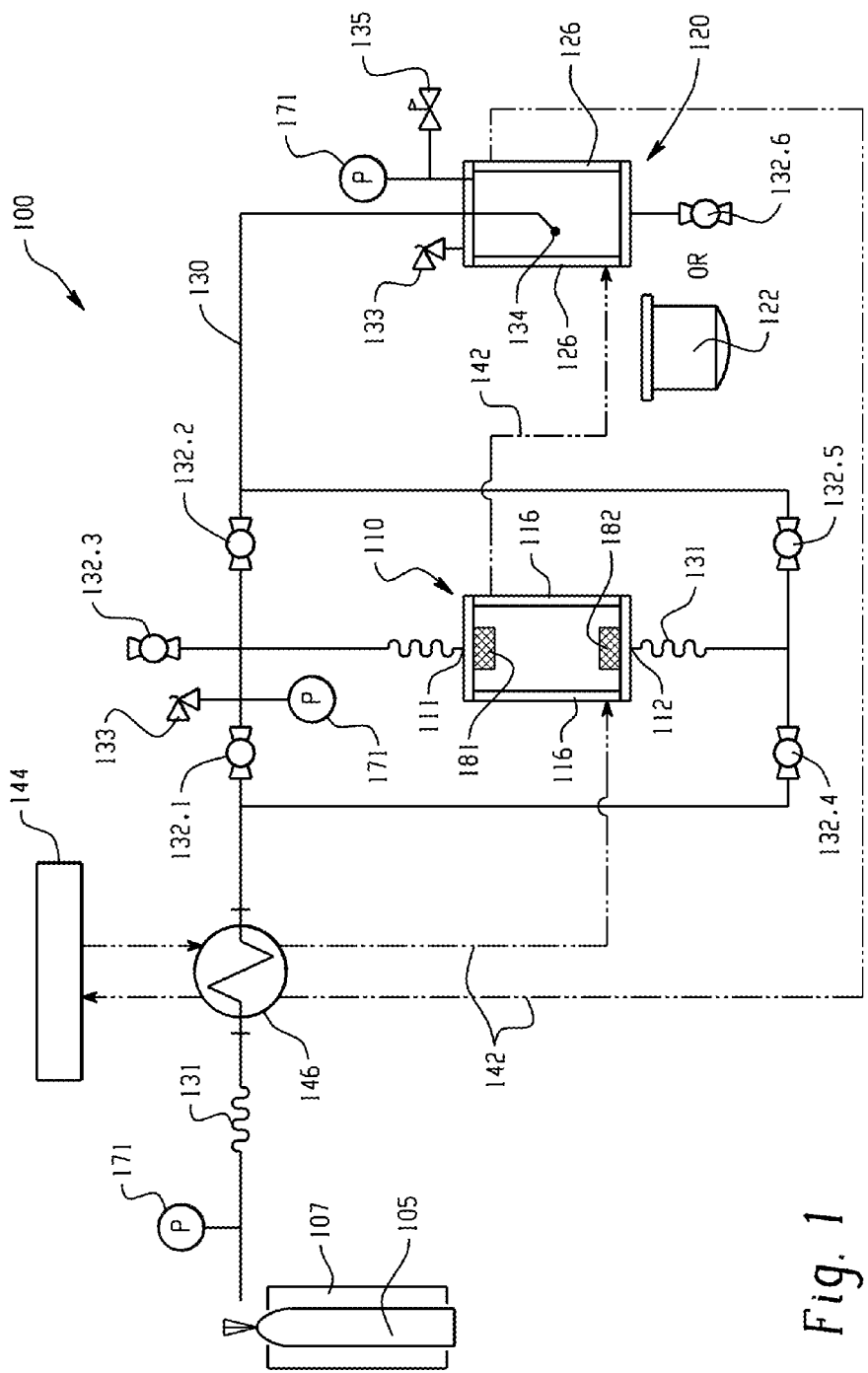
FIG. 1 is a schematic diagram of an extraction system.

Disclosed are examples of apparatuses and methods for removing an extracted material from a source material using a process fluid.

In some examples, the process fluid can be carbon dioxide. In some examples, the process fluid can be supercritical carbon dioxide. The process fluid can be any other fluid suitable for forming a mixture when placed in contact with the source material. Optionally, certain additives can be included in the process fluid, for example, ethanol.

In some examples, the source material can be a botanical substance. In some examples, the extracted material can include at least one of a botanical oil and a wax. In other examples, the source material can be any material in which extraction is desired. For example, the source material could be any physical article such as an instrument, tool, medical device, or implant. By operation of the disclosed systems, manufacturing fluids or other forms of residue can be removed from the surface of the physical article.

Labels such as extraction apparatus, recirculating extraction apparatus, fractional extraction apparatus, dual-phase extraction apparatus, and valveless separation are used to describe various examples and attributes of the example apparatuses disclosed herein. While particular features, materials, dimensions, arrangements, and methods of use may be disclosed in connection with one example, these features, materials, dimensions, arrangements, and methods of use can also be used with other examples, regardless of whether they are labeled extraction apparatus, recirculating extraction apparatus, fractional extraction apparatus, and dual-phase extraction apparatus. Apparatus labels are not meant to be limited to only the particular features, materials, dimensions, arrangements, and methods of use disclosed in connection with apparatuses of the same label.

For example, a particular type of extraction vessel, separation chamber, overflow chamber, storage tank, process fluid canister, conduit, separation portion, orifice, temperature regulator, temperature regulation line, heat exchanger, pump, pump fluid line, filter, filter plug, valve, instruments, gauges, and other features and aspects, and their orientation, location, and methods of use disclosed herein in connection with one example of an apparatus can be used in or combined with other examples of apparatuses whether or not specifically disclosed in the discussion of the other example apparatus. Also, features such as recirculation, fractional extraction, dual-phase pumping, and valveless separation that may be disclosed in connection with a particular example of an apparatus can be used in or combined with other examples of apparatuses whether or not specifically disclosed in the discussion of the other example apparatus.

Likewise, while some examples disclose the use of one or more extraction vessel, separation chamber, overflow chamber, storage tank, process fluid canister, conduit, separation portion, orifice, temperature regulator, temperature regulation line, heat exchanger, pump, pump fluid line, filter, filter plug, valve, instruments, gauges, and other features and aspects, these features and aspects can also be combined in any number for use in connection with examples of other apparatuses in which they are not expressly discussed.

One example of an extraction apparatus can include an extraction vessel configured to receive a process fluid, permit the process fluid to come into contact with a source material within the extraction vessel, permit an extracted material to be removed from the source material, and permit the extracted material and the process fluid to form a mixture. The extraction vessel can include an extraction vessel filter adapted to retain portions of the source material while also allowing the mixture to pass.

The extraction apparatus can include a separation chamber.

The extraction apparatus can include a circulation conduit configured to selectively restrict, allow, and reversibly direct flow of the process fluid into and out of the extraction vessel and permit the mixture to flow from the extraction vessel to the separation chamber. The circulation conduit can include a separation portion configured to receive the mixture and permit a portion of the extracted material to separate from the mixture within the separation chamber.

The extraction apparatus can include a temperature regulator. The temperature regulator can include a temperature regulation fluid and a temperature regulation fluid circulation line. The temperature regulator can be configured to permit recirculation of the temperature regulation fluid and regulate the temperature of the process fluid.

The extraction apparatus can include a back pressure regulator configured to maintain pressure within the separation chamber and vent the process fluid.

In some examples, the extraction apparatus can include a heating source configured to heat the process fluid prior to ingress of the process fluid into the extraction vessel.

In some examples, the extraction apparatus can include a heat exchanger configured to regulate temperature of the process fluid prior to ingress of the process fluid into the extraction vessel.

In some examples, the extraction apparatus can include an extraction vessel temperature regulator. In some examples, the extraction apparatus can include a separation chamber temperature regulator.

In some examples the circulation conduit can include valves configured to selectively restrict, allow, and reversibly direct flow of the process fluid through the circulation conduit.

In some examples the extraction vessel can include a first extraction vessel filter and a second extraction vessel filter. In some examples, the extraction apparatus can be configured to permit reversal of a direction of flow of the process fluid through the first extraction vessel filter and the second extraction vessel filter.

In some examples the separation portion can include an orifice. In some examples the separation portion can be orientated to direct the process fluid along an inner wall of the separation chamber in a generally rotational manner. In some examples the orifice can be sized to match a flow rate of the process fluid.

A recirculating extraction apparatus can include an extraction vessel configured to receive a process fluid, permit the process fluid to come into contact with a source material within the extraction vessel, permit an extracted material to be removed from the source material, and permit the extracted material and the process fluid to form a mixture. The extraction vessel can include a filter adapted to retain portions of the source material while also allowing the mixture to pass.

The recirculating extraction apparatus can include a separation chamber. The recirculating extraction apparatus can include an overflow chamber.

The recirculating extraction apparatus can include a circulation conduit configured to selectively restrict, allow, and reversibly direct flow of the process fluid into and out of the extraction vessel, permit the mixture to flow from the extraction vessel to the separation chamber, permit the process fluid to flow from the separation chamber to the overflow chamber, and permit recirculation of the process fluid. The circulation conduit can include a separation portion configured to receive the mixture and permit a portion of the extracted material to separate from the mixture within the separation chamber.

The recirculating extraction apparatus can include a temperature regulator. The temperature regulator can include a temperature regulation fluid and a temperature regulation fluid circulation line. The temperature regulator can be configured to permit recirculation of the temperature regulation fluid and regulate the temperature of the process fluid.

The recirculating extraction apparatus can include a pump configured to increase or maintain the pressure of the process fluid.

In some examples, the recirculating extraction apparatus can include a heating source configured to heat the process fluid prior to ingress of the process fluid into the extraction vessel.

In some examples, the recirculating extraction apparatus can include a heat exchanger configured to regulate temperature of the process fluid prior to ingress of the process fluid into the extraction vessel.

In some examples, the recirculating extraction apparatus can include a regenerative heat exchanger.

In some examples, the recirculating extraction apparatus can include an extraction vessel temperature regulator. In some examples, the recirculating extraction apparatus can include a separation chamber temperature regulator. In some examples, the recirculating extraction apparatus can include an overflow chamber temperature regulator.

In some examples of a recirculating extraction apparatus, the circulation conduit can include valves configured to selectively restrict, allow, and reversibly direct flow of the process fluid through the circulation conduit.

In some examples of a recirculating extraction apparatus, the extraction vessel can include a first extraction vessel filter and a second extraction vessel filter. In some examples, the recirculating extraction apparatus can be configured to permit reversal of a direction of flow of the process fluid through the first extraction vessel filter and the second extraction vessel filter.

In some examples of a recirculating extraction apparatus, the separation portion can include an orifice. In some examples of a recirculating extraction apparatus, the separation portion can be orientated to direct the process fluid along an inner wall of the separation chamber in a generally rotational manner. In some examples of a recirculating extraction apparatus, the orifice can be sized to match a flow rate of the process fluid.

A fractional extraction apparatus generally refers to an extraction apparatus in which a predetermined extracted material can be extracted from a source material using a process fluid under a predetermined temperature and pressure. For example, a fractional extraction apparatus may allow a first extracted material, for example an oil or wax having a particular molecular weight, to be removed from a source material by allowing the source material to be in contact with a process fluid under a first predetermined temperature and a first predetermined pressure. A volatile oil, for example, may have a relatively light molecular weight and may be extracted using a relatively lower temperature and/or pressure. In such examples, the process fluid may be in a liquid or a supercritical state depending on the first predetermined extracted material and process fluid.

After a first predetermined extracted material is removed from the source material, in some examples, a second predetermined extracted material may be removed from the remaining source material by allowing the remaining source material to be in contact with a process fluid under a second predetermined temperature and a second predetermined pressure. For example, a relatively higher temperature and pressure of the process fluid may be necessary to remove a second predetermined extracted material having a relatively greater molecular weight than the first predetermined extracted material. In such examples, the process fluid may be in a liquid or a supercritical state depending on the second predetermined extracted material and process fluid.

A fractional extraction apparatus is not limited to only removing two predetermined extracted materials. In some examples, only a first predetermined extracted material may be removed. In other examples, more than two predetermined extracted materials may be removed.

Examples of use of embodiments of such fractional extraction apparatuses could include using recirculated process fluid in successive fractional extractions, newly introduced process fluid of the same kind as earlier fractional extractions, newly introduced process fluid of a different kind, or some combination of the foregoing. One or more of the process fluid, temperature, and pressure may be the same or different in each fractional extraction depending on the source material and the predetermined extracted materials.

In some embodiments, a fractional extraction apparatus, can include an extraction vessel having a first extraction vessel opening and a second extraction vessel opening. The extraction vessel can be configured to receive a process fluid through either of the first or a second extraction vessel openings. The extraction vessel can allow the process fluid to come into contact with a source material within the extraction vessel under either of a selectively configured first predetermined pressure and a first predetermined temperature to remove a first predetermined extracted material from the source material to form a first mixture or a second predetermined pressure and a second predetermined temperature to remove a second predetermined extracted material from the source material to form a second mixture.

A fractional extraction apparatus can include a first filter located near the first extraction vessel opening. The first filter can be configured to retain the source material while also allowing the process fluid and the first or second mixture to pass.

A fractional extraction apparatus can include a second filter located near the second extraction vessel opening. The second filter can be configured to retain the source material while also allowing the process fluid and the first or second mixture to pass.

A fractional extraction apparatus can include a separation chamber. The fractional extraction apparatus can include an overflow chamber.

A fractional extraction apparatus can include a circulation conduit configured to selectively direct the process fluid into or out of either of the first or second extraction vessel openings, selectively allow and reversibly direct flow of the first or second mixture into or out of the first or second extraction vessel openings while allowing continuous flow of the first or second mixture from the extraction vessel to the separation chamber. The a circulation conduit can be configured to allow a portion of the first or second predetermined extracted material to separate from the first or second mixture within the separation chamber, allow the process fluid to flow from the separation chamber to the overflow chamber, and allow recirculation of the process fluid to the extraction vessel through either of the first or second extraction vessel openings to allow the process fluid to come into contact with the source material within the extraction vessel.

A fractional extraction apparatus can include a temperature regulator including a heating/cooling source, a temperature regulation fluid, a temperature regulation line, and one or more heat exchangers. The temperature regulator can be configured to allow recirculation of the temperature regulation fluid and to regulate the temperature of the process fluid.

An example of a dual-phase recirculating extraction apparatus can include an extraction vessel configured to receive a process fluid through either of a first or a second extraction vessel opening and allow the process fluid to come into contact with a source material within the extraction vessel to form a mixture. The dual-phase recirculating extraction apparatus can include a first filter located near the first extraction vessel opening and adapted to retain the source material while also allowing the process fluid and the first or second mixture to pass.

A dual-phase recirculating extraction apparatus can include a second filter located near the second extraction vessel opening and adapted to retain the source material while also allowing the process fluid and the first or second mixture to pass.

A dual-phase recirculating extraction apparatus can include a separation chamber. The dual-phase recirculating extraction apparatus can include an overflow chamber. The dual-phase recirculating extraction apparatus can include a circulation conduit configured to selectively direct the process fluid into or out of either of the first or second extraction vessel openings, selectively allow and reversibly direct flow of the mixture into or out of the first or second extraction vessel openings while allowing continuous flow of the mixture from the extraction vessel to the separation chamber, allow a portion of the extracted material to separate from the mixture within the separation chamber, allow the process fluid to flow from the separation chamber to the overflow chamber, and allow recirculation of the process fluid to the extraction vessel through either of the first or second extraction vessel openings.

A dual-phase recirculating extraction apparatus can include a gas pump connected by the circulation conduit and configured to receive the process fluid in a gaseous state and compress the process fluid. A dual-phase recirculating extraction apparatus can include a liquid pump connected by the circulation conduit and configured to receive the process fluid in a gaseous state and compress the process fluid.

A dual-phase recirculating extraction apparatus can include an extraction temperature regulator including a heating/cooling source, a temperature regulation fluid, a temperature regulation line, and one or more of the following heat exchanger, the temperature regulator configured to allow recirculation of the temperature regulation fluid and to regulate the temperature of the process fluid.

A dual-phase recirculating extraction apparatus can include a recirculation thermal manager including a cooling source, a thermal management fluid, a thermal management line, and at least one heat exchanger. The recirculation thermal manager can be configured to allow recirculation of the thermal management fluid. The recirculation thermal manager can be configured to manage the temperature of the process fluid. The recirculation thermal manager can be configured to selectively cause the process fluid to change from a gaseous state to a liquid state.

In some examples of the dual-phase recirculating extraction apparatus, the extraction vessel temperature regulation fluid and the thermal management fluid can be water.

A filter plug assembly can include a base having a first base surface with at least one base surface channel. The base surface channel can include a flow cavity opening of a flow cavity extending through the base to a second base surface.

The base surface channel can further include an instrument cavity opening of an instrument cavity extending through the base to the second base surface.

A filter plug assembly can include a filter retaining piece. A filter plug assembly can include a filter. A filter plug assembly can include a filter fastener for releasably securing the filter retaining piece to the base while holding the filter between the filter retaining piece and the base and forming a filter plug sub-assembly.

A filter plug assembly can include an extraction vessel fastener for releasably securing the filter plug sub-assembly to an extraction vessel opening such that an instrument connected to the instrument cavity may sense a condition of the process fluid or mixture within the filter plug sub-assembly without contacting a source material within an extraction vessel.

In some examples, aspects of a fractional extraction apparatus can be combined with aspects of a dual-phase recirculating extraction apparatus. Both a fractional extraction apparatus and a dual-phase recirculating extraction apparatus can include a filter plug assembly.

In some examples, the filter plug assembly may allow the extraction vessel to be opened or closed without disconnecting the instrument from the filter plug sub-assembly. In some examples, the instrument is a thermocouple having a stem extending from the second base surface through the instrument cavity into the base surface channel of the first base surface.

The circulation conduit of the apparatuses disclosed herein can include a separation portion configured to allow the first or second mixture to decompress and separate the process fluid from a portion of the first or second predetermined extracted material within the separation chamber without the use of a valve or regulator for achieving separation.

The heat exchangers of the apparatuses disclosed herein can include the following types of heat exchangers: a conduit heat exchanger, an extraction vessel heat exchanger, a separation chamber heat exchanger, an overflow chamber heat exchanger, a storage tank heat exchanger, a gas pump heat exchanger, and an air pump heat exchanger. An example of a conduit heat exchanger could have a tube in tube style construction made of 304 stainless steel. An example of an extraction vessel heat exchanger could include a heating/cooling jacket surrounding the extraction vessel. In some examples, a heating/cooling jacket for a 5 liter extraction vessel may have a volume of 18 Liters. In some examples of a heating/cooling jacket for a 20 liter extraction vessel the heating/cooling jacket may have a volume of 4.5 liters. Heating/cooling jackets could also be used for the separation chamber heat exchanger, overflow chamber heat exchanger, and storage tank heat exchanger.

The apparatus disclosed herein can include one or multiple extraction vessels, one or multiple separation chambers, one or multiple overflow chambers, and one or multiple storage tanks. Each such component may be connected to the circulation conduit and have its own heat exchanger connected to either the temperature regulation line, in the case of the extraction vessels, or the thermal management line, in the case of the other components.

The circulation conduit of the apparatuses disclosed herein can be configured to selectively direct the process fluid into or out of a predetermined extraction vessel among the at least two extraction vessels. The circulation conduit can be configured to selectively allow and reversibly direct flow of the first or second mixture into or out of the first or second extraction vessel openings of the predetermined extraction vessel while allowing continuous flow of the first or second mixture from the predetermined extraction vessel to a predetermined separation chamber among the at least two separation chambers. The circulation conduit can be configured to allow a portion of the first or second predetermined extracted material to separate from the first or second mixture within the predetermined separation chamber. The circulation conduit can be configured to direct flow of the process fluid to the overflow chamber. The circulation conduit can be configured to direct flow of the process fluid to a predetermined storage tank among the at least two storage tanks. The circulation conduit can be configured to allow the recirculation the process fluid to a predetermined extraction vessel among the at least two extraction vessels.

The apparatuses disclosed herein can be supported by a frame. The frame can incorporate weight sensors mounted below the frame. The apparatuses disclosed herein can include a process fluid canister. The process fluid canister can incorporate weight sensors mounted below a base of the canister.

DETAILED DESCRIPTION

Several examples of apparatuses configured to perform extraction and methods of use will now be disclosed in greater detail. The features, materials, dimensions, arrangements, and methods of use disclosed in connection with one particular example can be used with other examples of disclosed apparatuses and/or can be combined with additional aspects and with varied materials, dimensions, arrangements, and methods of use as are known in the art or hereafter discovered.

Turning now the exemplary apparatus shown in FIG. 1, an extraction apparatus 100 can include an extraction vessel 110 configured to receive a process fluid, permit the process fluid to come into contact with a source material within the extraction vessel 110, permit an extracted material to be removed from the source material, and permit the extracted material and the process fluid to form a mixture.

In some examples, the extraction vessel 110 can be about 1 liter and can be rated to a maximum pressure of about 1500 pounds per square inch (psi) at about 200 degrees Fahrenheit (° F.). In some examples, the extraction vessel 110 can have an opening for receiving the process fluid. In some examples, the extraction vessel can have multiple openings for receiving the process fluid. In the example shown in FIG. 1, the extraction vessel 110 includes a first extraction vessel opening 111 and a second extraction vessel opening 112. In some examples, the openings of the extraction vessel can be sealed using an elastomeric O-ring. One example of a suitable elastomeric O-ring is a Buna-90 O-ring.

The extraction vessel 110 can include an extraction vessel filter adapted to retain portions of the source material while also allowing the mixture to pass. In some examples, the extraction vessel 110 can have multiple filters. As shown in FIG. 1, the extraction vessel 110 can include a first extraction vessel filter 181 located near the first extraction vessel opening 111 and a second extraction vessel filter 182 located near the second extraction vessel opening 112.

The extraction apparatus 100 can include a separation chamber 120. In some examples, the separation chamber can be rated for about 500 psi at 200° F.

The extraction apparatus 100 can include a circulation conduit 130 configured to selectively restrict, allow, and reversibly direct flow of the process fluid into and out of the extraction vessel 110 and permit the mixture to flow from the extraction vessel 110 to the separation chamber 120. The circulation conduit 130 can be stainless steel in some examples. In other examples, the circulation conduit 130 can be made from one of a family of austenitic nickel-chromium based alloys, such as those supplied commercially under the brand name Inconel® by Special Metals Corporation. In other examples, the circulation conduit 130 can be made from other suitable material for high corrosion resistance. In other examples, the circulation conduit 130 can be steel or another suitable material for applications with low sanitary requirements. In some examples, the circulation conduit 130 can be sized about 304 stainless steel (SS) with about ⅜ inches diameter, and a wall thickness of about 0.035 inches. The circulation conduit 130 can include flexible portions 131.

The circulation conduit 130 can include one or more valves configured to selectively restrict, allow, and reverse a direction of flow of the process fluid through the circulation conduit 130 and other portions of the extraction apparatus 100. In some examples, the valves can be rated from about −22° F. to about 356° F.

In some examples, the circulation conduit 130 can be configured with a system of valves to selectively direct an amount of the process fluid to remain within the extraction vessel 110 for a desired time, for example, to allow the extraction process to be completed to a desired extent. In some examples, the extraction apparatus 100 can be configured with a system of valves to permit reversal of a direction of flow of the process fluid through the extraction vessel 110. In some examples, the reversal of the direction of flow of the process fluid through the extraction vessel 110 can facilitate cleaning or clearing of the first and second extraction vessel filters 181 and 182 without interrupting ongoing extraction processing.

In some examples, the system of valves can include one or more pairs of opposing valves for directing the flow of process fluid. In the example of FIG. 1, the first, second, third, fourth, and fifth valves, labeled 132.1, 132.2, 132.3, 132.4, and 132.5 respectively, can be positioned along the circulation conduit 130 as shown. To direct process fluid into the extraction vessel 110 at a first extraction vessel opening 111, the first valve 132.1 can be opened while the second valve 132.2 can be closed. To direct the process fluid out of the extraction vessel 110 and further downstream in the system, the second valve 132.2 can be opened while the first vale 131.1 can be closed. The third valve, 132.3, can be used to decompress the system and vent process fluid out of the system.

In the example of FIG. 1, the fourth and fifth valves, 132.4 and 132.5, can be configured to direct the process fluid into or out of a second extraction vessel opening 113. Optionally, the valves could be used to direct the process fluid into or out of multiple openings of the extraction vessel 110. For example, by opening the first valve 132.1 and fifth valve 132.5 while closing the downstream second valve 132.2 and fourth valve 132.4, the process fluid can be directed into the first extraction vessel opening 111 and out of the second extraction vessel opening 112. By closing the first valve 132.1 and fifth valve 132.5 while opening the second valve 132.2 and fourth valve 132.4, the process fluid can be directed into the second extraction vessel opening 112 and out of the first extraction vessel opening 111.

In the example apparatus depicted in FIG. 1, the process fluid can be directed in a first direction of flow such that the process fluid enters the extraction vessel 110 through extraction vessel opening 111, passing through the extraction vessel filter 181. According to this direction of flow, the process fluid can pass through an interior portion of the extraction vessel 110 where it can come into contact with the source material, extract the extracted material, and form the mixture. The mixture can then be directed to pass through filter 182 and exit the extraction vessel 110 at opening 112.

Optionally, the valves can be re-configured such that the direction of flow of the process fluid and/or mixture can be reversed, allowing the process fluid and/or mixture to enter the extraction vessel 110 at extraction vessel opening 112, pass through the extraction vessel filter 182, pass through filter 181, and exit at extraction vessel opening 111.

The circulation conduit 130 can include a separation portion 134 configured to receive the mixture and permit a portion of the extracted material to separate from the mixture within the separation chamber 120. In some examples, the separation portion 134 can allow the process fluid to decompress in the separation chamber 120 and separate the extracted material from the process fluid without the use of a valve or regulator for separation.

In some examples, the separation portion 134 can include an orifice. The orifice can be sized to match a flow rate of the process fluid. In some examples, the orifice can be about 0.010 inches in diameter. In some examples, the orifice can restrict the flow of process fluid, allowing a significant pressure drop in the mixture after passing through the orifice and allowing the process fluid to change from a subcritical or supercritical state to a gaseous state, thereby allowing the extracted material to fall out, or separate, from the process fluid.

In some examples, the separation portion 134 can be positioned near an inner wall of the separation chamber 120. In some examples, the separation portion 134 can be orientated to direct the process fluid along the inner wall of the separation chamber 120 in a generally rotational manner. In some examples, a portion of circulation conduit 130 leading to the separation portion 134 can be angled at an appropriate angle, which can be about 45°. In some examples, the inner wall of the separation chamber 120 can be relatively warmer than an interior portion of the separation chamber 120. In some examples, directing the process fluid along the inner wall of the separation chamber 120 in a generally rotational manner can help to keep the process fluid in a gaseous state after the process fluid is depressurized in the separation chamber 120. In such examples, the relatively warmer inner wall can help to counteract the Joule-Thompson cooling effect that can occur when the process fluid decompresses.

In some examples, the extraction apparatus 100 can be configured to receive the process fluid from a process fluid canister 105, which can be a cylinder or any other storage device capable of holding the process fluid.

An initial state of the process fluid in the process fluid canister 105 can be solid, liquid, gaseous, or supercritical. Where the process fluid is in an initial liquid state, a siphon can be optionally used to remove the process fluid from a top opening of the process fluid canister while maintaining consistent pressure. Alternatively, the liquid process fluid can be removed by inverting the process fluid canister 105 such that the opening is on the bottom.

In some examples, the extraction apparatus 110 can include a heating source 107 configured to heat the process fluid prior to ingress of the process fluid into the extraction vessel 110. In some examples, heating source 107 can heat the process fluid within the process fluid canister 105. The heating source 107 can be a heating blanket, electric band heater, induction heater, coiled tubing with heating fluid in intimate contact, or an open flame.

In some examples, as the process fluid is heated by the heating source 107, a temperature and the internal pressure of the process fluid rises. In this way, a desired pressure for the process fluid in the system can be achieved without the need for a pump. If necessary, the heating source 107 can deliver continuous or recurring heat to the process fluid so as to maintain the pressure within the system.

Optionally, the temperature and internal pressure of the process fluid can be increased to the point of allowing a phase transformation of the process fluid. Optionally, this phase transformation can occur within the process fluid canister 105. When the initial state of the process fluid is liquid or gas, increasing the temperature and pressure above the fluid's critical point can allow a phase change to a supercritical state. For example, heating carbon dioxide above about 87° F. at a pressure above about 1083 psi will result in a phase change to a supercritical state.

The extraction apparatus 100 can include a temperature regulator. The temperature regulator can include a temperature regulation fluid and a temperature regulation fluid circulation line 142. In the example shown in FIG. 1, the temperature regulator can include a chiller/heater 144 with temperature regulation fluid circulation line 142 running through the extraction apparatus 100 to regulate temperature of the process fluid.

The temperature regulator can be configured to permit recirculation of the temperature regulation fluid. The temperature regulation fluid circulation line 142 can run in close proximity to the circulation conduit 142. In some examples, the circulation line can form a coil around the temperature regulation fluid circulation line 142.

In some examples, the temperature regulation fluid can be liquid water, steam or another heating/cooling fluid. In some examples, the temperature regulation fluid can include distilled water. In some examples, the temperature regulation fluid can be a mixture, for example, a mixture of about 50% water and about 50% glycol.

The temperature regulator can be configured to raise, lower, or maintain the temperature of the process fluid prior to introduction into the extraction vessel 110 to achieve a desired temperature. In some examples, the temperature regulator can be configured to optionally cause a phase change in the process fluid prior to entering the extraction vessel 110.

In some examples, temperature regulator can include a heat exchanger 146 configured to regulate temperature of the process fluid prior to ingress of the process fluid into the extraction vessel 110. In some examples, the heat exchanger 146 can be a tube-in-tube configuration, allowing the process fluid to be in close physical proximity to the temperature regulation fluid, thereby allowing for the exchange of heat between the two fluids while maintaining their separation from one another. Alternative configurations of the heat exchanger 146 could include a shell & tube design, a coil design, or any other method of heat exchange.

In some examples, the temperature regulator can be configured to regulate the temperature of the process fluid within the extraction vessel 110. In some examples, temperature regulator can be configured to regulate the temperature of the process fluid within the separation chamber 120. As shown in the example of FIG. 1, the extraction apparatus 100 can include an extraction vessel temperature regulator 116 and a separation chamber temperature regulator 126. As shown in this example, the temperature regulation fluid circulation line 142 can extend to the extraction vessel temperature regulator 116 and the separation chamber temperature regulator 126. In the example shown in FIG. 1, the system can be configured to permit the temperature regulation fluid to flow through the temperature regulation fluid circulation line 142, through the extraction vessel temperature regulator 116, through the temperature regulation fluid circulation line 142, through the separation chamber temperature regulator 126, and through the temperature regulation fluid circulation line 142. In some examples, the extraction vessel temperature regulator 116 can be a heating/cooling jacket surrounding an exterior portion of extraction vessel 110. In some examples, the separation chamber temperature regulator 126 can be a heating/cooling jacket surrounding an exterior portion of separation chamber 120.

In some examples, the temperature regulator can regulate the temperature of the process fluid in other portions of the circulation conduit 130. In one example, a portion of the circulation conduit 130 connecting the extraction vessel 110 with the separation chamber 120 could run in close proximity to the temperature regulation fluid circulation line 142. Alternative configurations could include a shell & tube design, a coil design, or any other method of heat exchange. Any other portion of the circulation conduit 130 could be regulated in the same ways.

In some examples, the extraction apparatus 100 can include a back pressure regulator 135 configured to maintain pressure within the separation chamber 120 and vent the process fluid. In some examples, the backpressure regulator 135 can be located at a discharge opening of the separation chamber 120.

In some examples, a collection cup 122 can be used to capture the extracted material after separation from the process fluid in the separation chamber 120.

In other examples, a valve, such as the sixth valve 132.6 shown in FIG. 1, can be used to direct the extracted material out of the separation chamber 120 after separation from the process fluid. Optionally, the extracted material can be directed out of the separation chamber 120 while the separation chamber 120 remains under pressure.

As shown in FIG. 1, the extraction apparatus 100 can include one or more pressure gauges 171. As shown in FIG. 1, the extraction apparatus 100 can include one or more relief valves 133. As shown in FIG. 1, the extraction apparatus 100 can include one or more relief valves 133.

Figure 2:
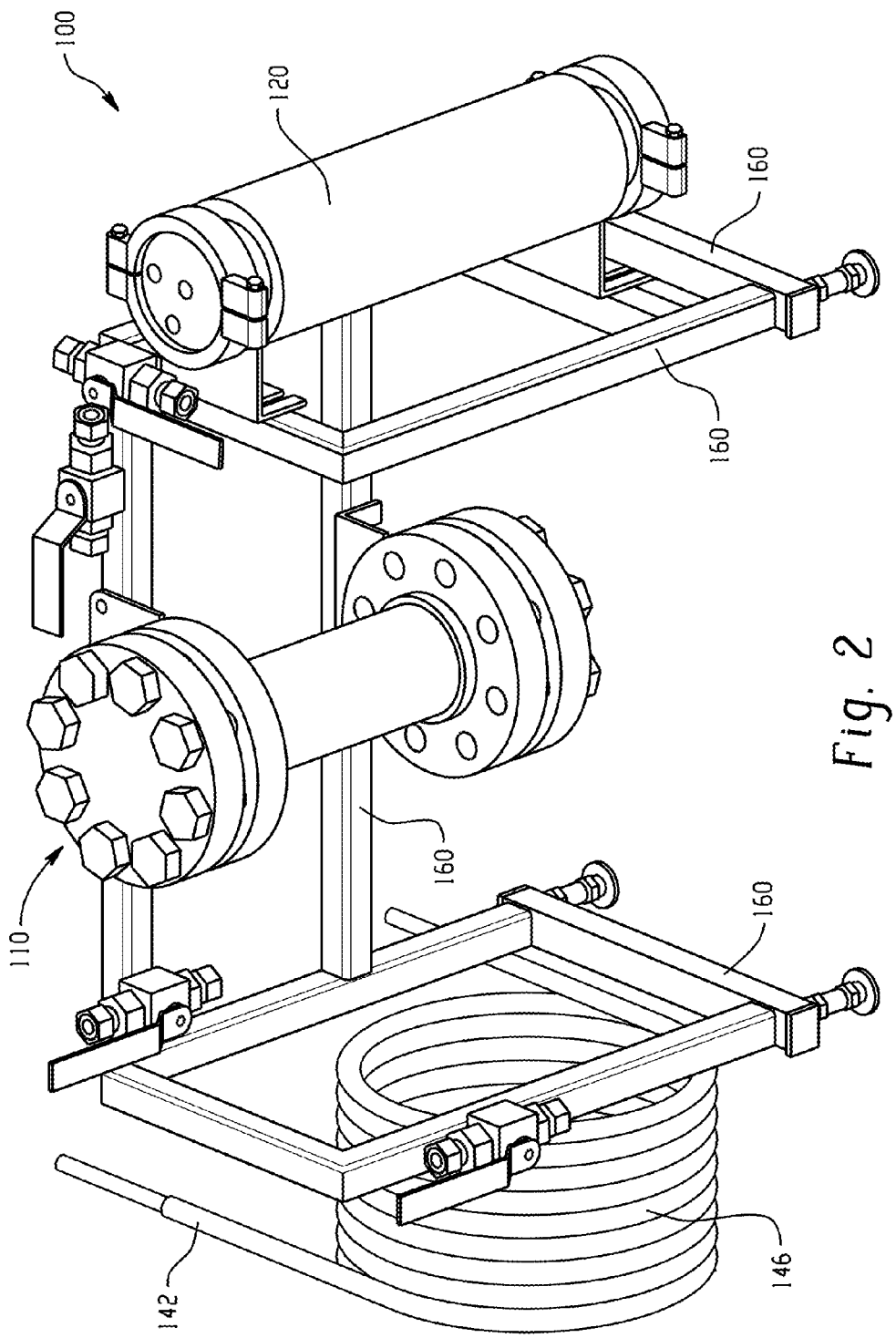
FIG. 2 is a perspective view of an extraction system.

In the example shown in FIG. 2, some of the described aspects of the extraction apparatus 100 are shown mounted on a frame 160 in an exemplary arrangement.

Figure 3:
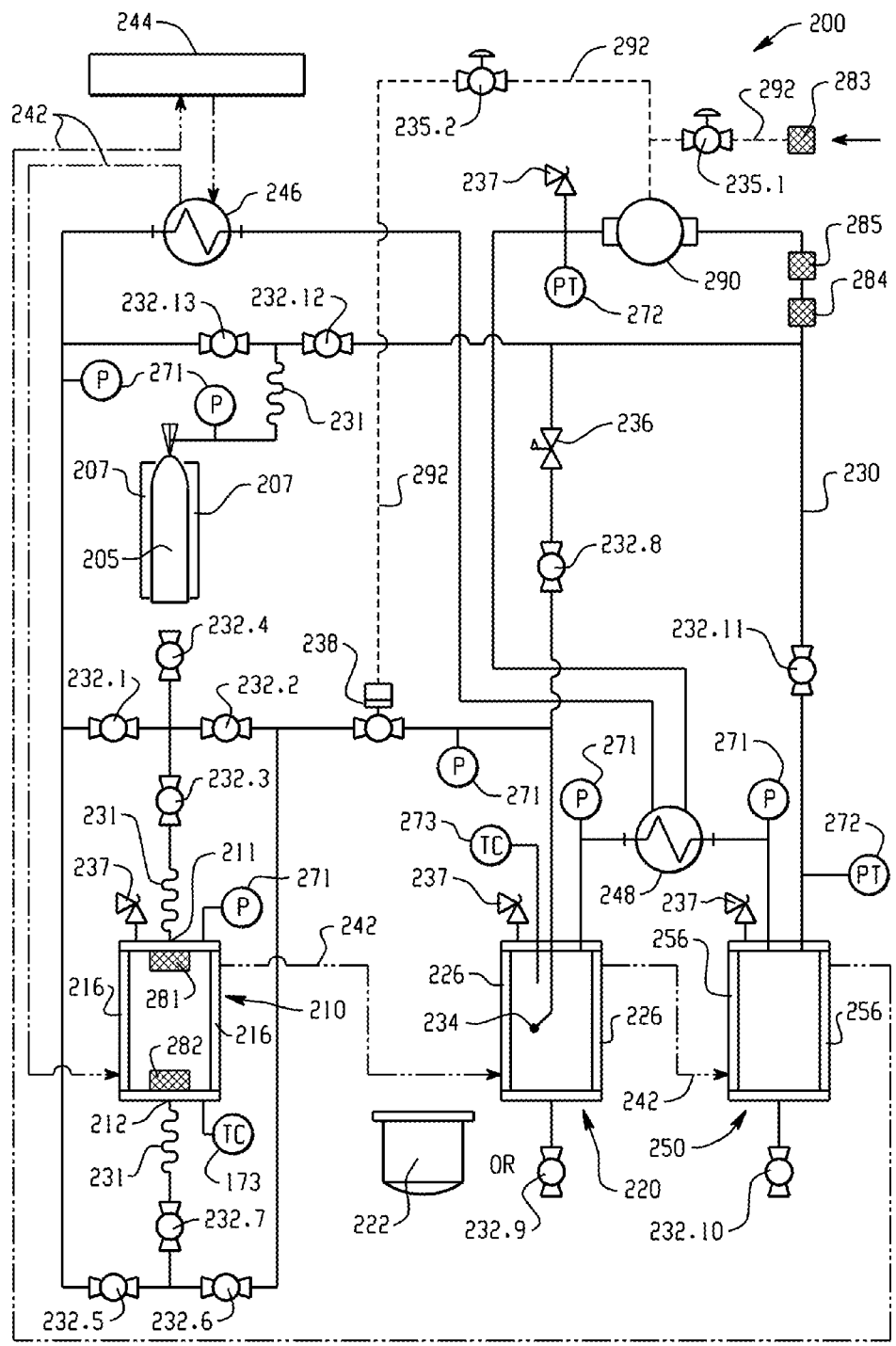
FIG. 3 is a schematic diagram of an extraction system.

As shown in FIG. 3, a recirculating extraction apparatus 200 can include an extraction vessel 210 configured to receive a process fluid, permit the process fluid to come into contact with a source material within the extraction vessel 210, permit an extracted material to be removed from the source material, and permit the extracted material and the process fluid to form a mixture.

In some examples, the extraction vessel 210 can have an opening for receiving the process fluid. In some examples, the extraction vessel can have multiple openings for receiving the process fluid. In the example shown in FIG. 3, the extraction vessel 210 includes a first extraction vessel opening 211 and a second extraction vessel opening 212. In some examples, the openings of the extraction vessel can be sealed using an appropriate O-ring, such as an elastomeric O-ring. One example of a suitable elastomeric O-ring can be a Buna-90 O-ring.

The extraction vessel 210 can include an extraction vessel filter adapted to retain portions of the source material while also allowing the mixture to pass. In some examples, the extraction vessel 210 can have multiple filters. As shown in FIG. 3, the extraction vessel 210 can include a first extraction vessel filter 281 located near the first extraction vessel opening 211 and a second extraction vessel filter 282 located near the second extraction vessel opening 212.

Figures 4A, 4B, 4C:
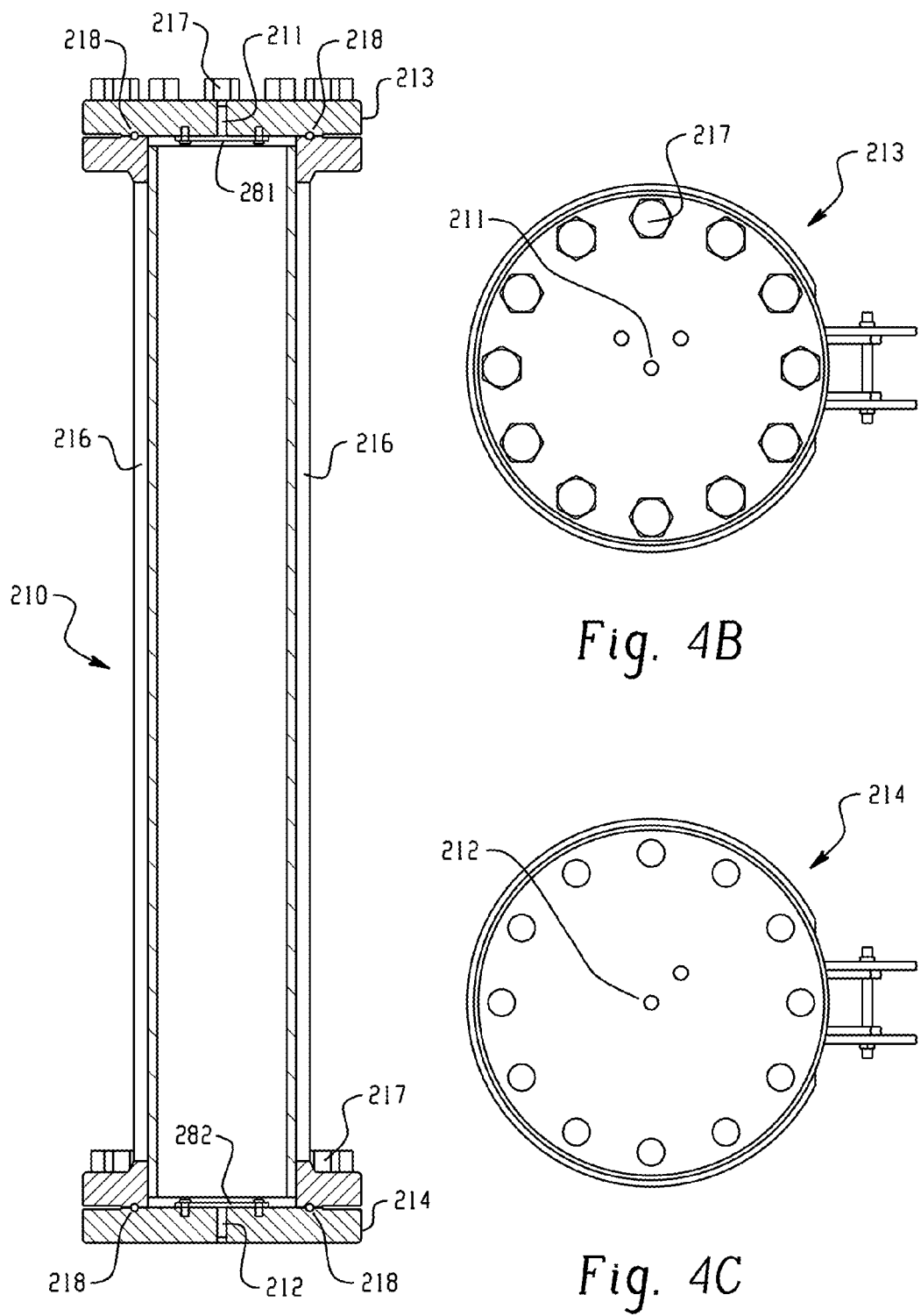
FIG. 4(A) is a cross-section of an extraction vessel.
FIG. 4(B) is a top view of an extraction vessel.
FIG. 4(C) is a bottom view of an extraction vessel.

In the example shown in FIGS. 4A, 4B, and 4C, the extraction vessel 210 can include an interior portion surrounded by an extraction vessel temperature regulator 216, with a first flange 213 and a second flange 214. As also shown in FIG. 4A, O-rings 218 can be used to seal the first and second flanges 213 and 214 of the extraction vessel 210. As also shown in FIG. 4A, the first and second extraction vessel filters 281 and 282 can be located near the first and second extraction vessel openings 211 and 212 respectively.

Figures 5A, 5B, 5C:
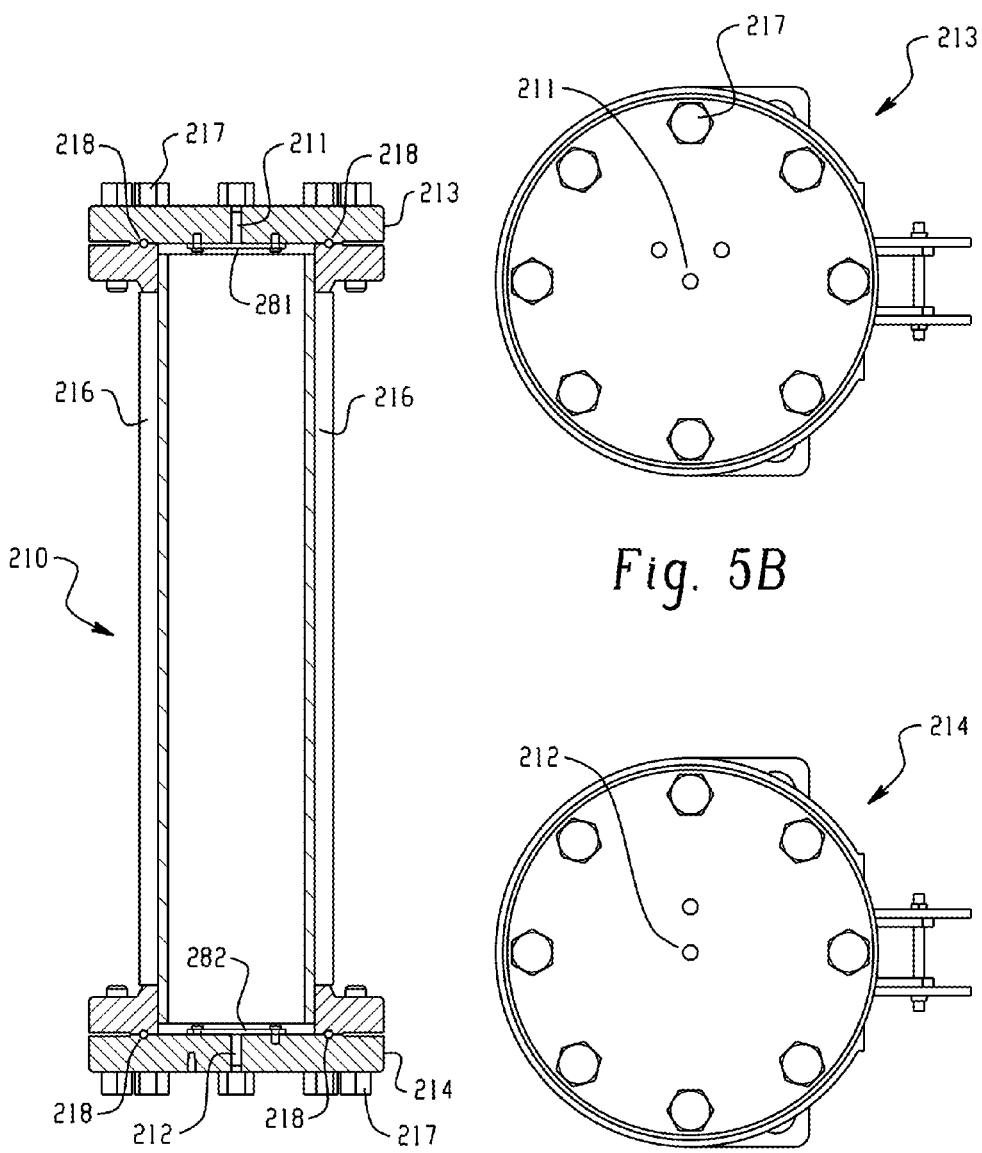
FIG. 5(A) is a cross-section of an extraction vessel.
FIG. 5(B) is a top view of an extraction vessel.
FIG. 5(C) is a bottom view of a extraction vessel.

As shown in FIG. 4B, the first flange 213 can have one or more openings, which may include the first extraction vessel opening 211. As shown in FIG. 4C, the second flange 214 can have one or more openings, which may include the second extraction vessel opening 212. In some examples, the top and bottom flanges can be secured with bolts 217. In some examples, the extraction vessel can be about 20 liters and can be rated to a maximum pressure of about 1500 psi at about 200° F. In other examples, the extraction vessel 210 can be about 5 liters and can be rated to a maximum pressure of about 1500 psi at about 200° F. FIGS. 5A, 5B, and 5C show another example configuration of extraction vessel 210, top flange 213, and bottom flange 214.

Figures 6A, 6B, 6C:
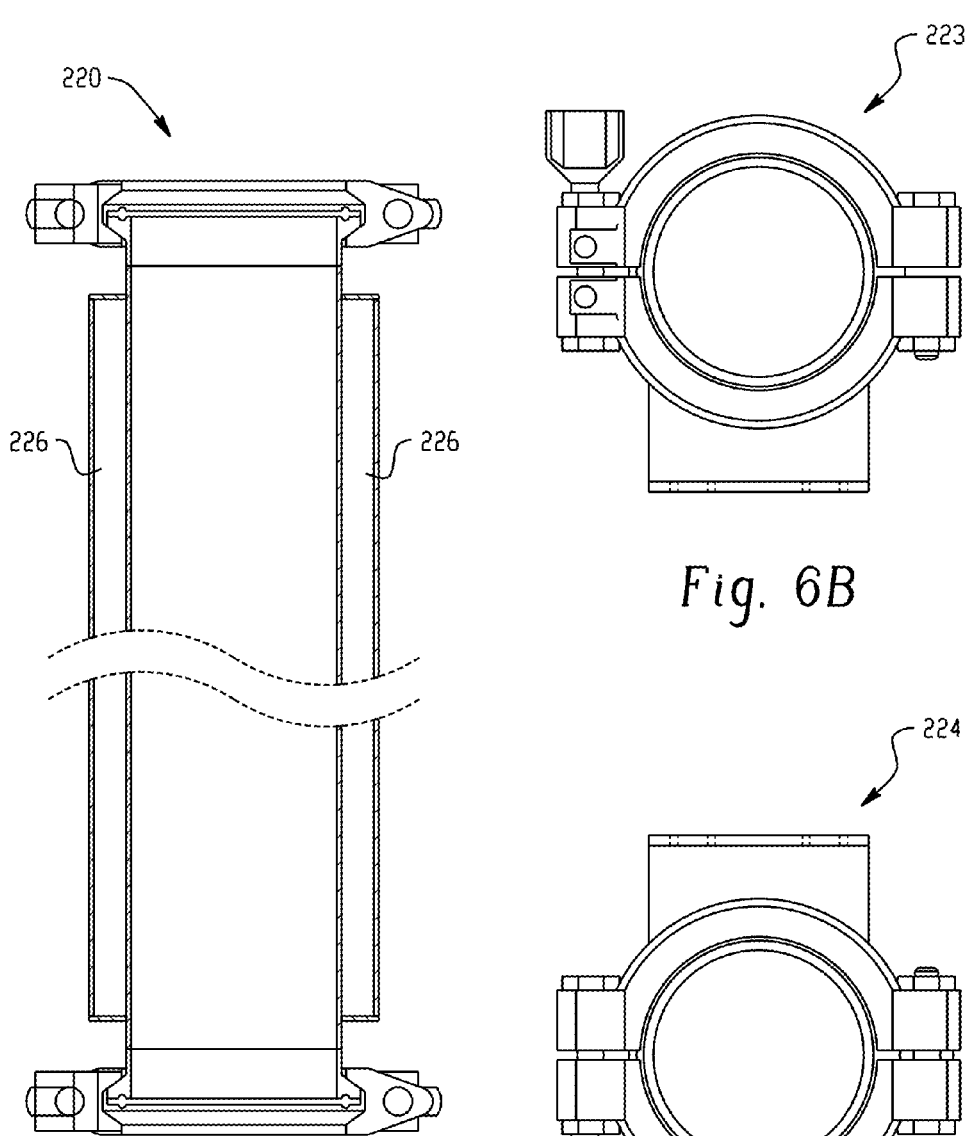
FIG. 6(A) is a cross-section of a separation chamber.
FIG. 6(B) is a top view of a separation chamber.
FIG. 6(C) is a bottom view of a separation chamber.

The recirculating extraction apparatus 200 can include a separation chamber 220. As shown in FIG. 6A, the separation chamber 220 can have an interior portion, surrounded by a separation chamber temperature regulator 226. As shown in FIGS. 6B and 6C, the separation chamber 220 can have a first cap 223 and a second cap 224. In some examples, the separation chamber 220 can be rated for about 500 psi at about 200° F.

Figure 7A:
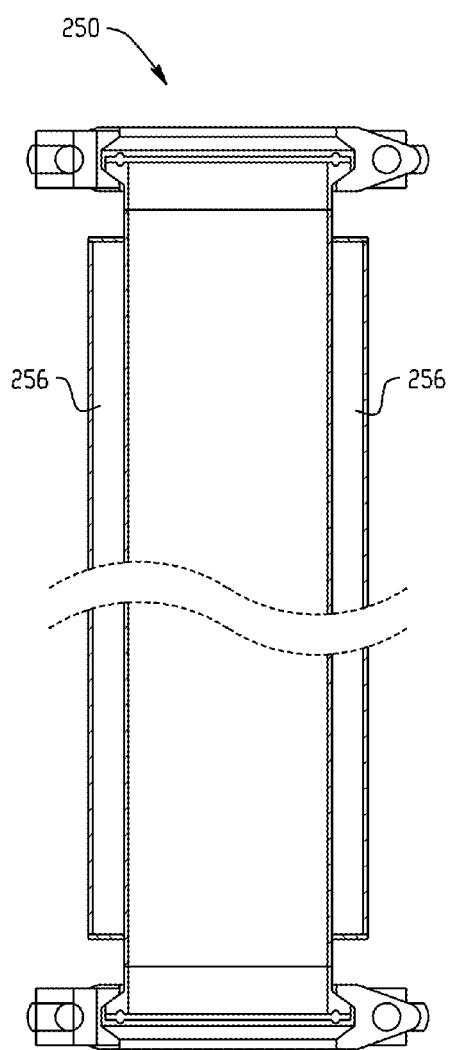
FIG. 7(A) is a cross-section of an overflow chamber.
Figure 7B:
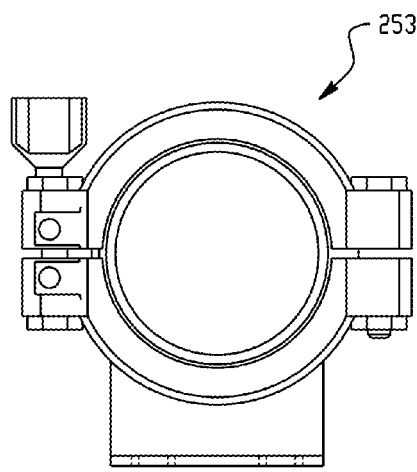
FIG. 7(B) is a top view of an overflow chamber.
Figure 7C:
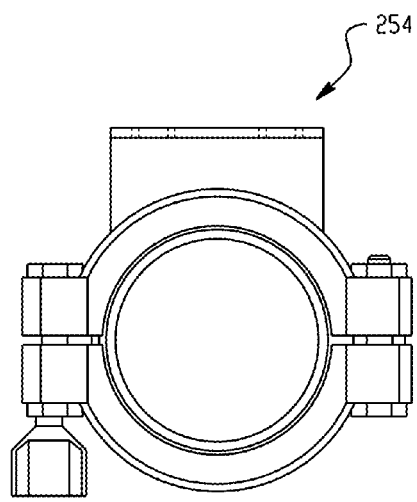
FIG. 7(C) is a bottom view of an overflow chamber.

The recirculating extraction apparatus 200 can include an overflow chamber 250. As shown in FIG. 7A, the overflow chamber 250 can have an interior portion, surrounded by an overflow temperature regulator 256. As shown in FIGS. 7B and 7C, the overflow chamber 250 can have a first cap 253 and a second cap 254. In some examples, the overflow chamber 250 can be rated for about 500 psi at 200° F.

The recirculating extraction apparatus 200 can include a circulation conduit 230 configured to selectively restrict, allow, and reversibly direct flow of the process fluid into and out of the extraction vessel 210. The circulation conduit 230 can also be configured to permit the mixture to flow from the extraction vessel 210 to the separation chamber 220. The circulation conduit 230 can also be configured to permit the process fluid to be recirculated through the extraction vessel 210, separation chamber 220, and overflow chamber 250.

The circulation conduit 230 can be stainless steel in some examples. In other examples, the circulation conduit 230 can be made from one of a family of austenitic nickel-chromium based alloys, such as those supplied commercially under the brand name Inconel® by Special Metals Corporation. In other examples, the circulation conduit 230 can be made from and other suitable material for high corrosion resistance. In other examples, the circulation conduit 230 can be steel or another suitable material for applications with low sanitary requirements. In some examples, the circulation conduit 230 can be sized about 304 stainless steel (SS) with about ⅜ inches diameter, and a wall thickness of about 0.035 inches. The circulation conduit 230 can include flexible portions 231.

In some examples, a pump 290 can be configured to create a desired pressure and to help circulate the process fluid through the system and to recover the process fluid for recirculation. Any type of pump suitable for use with the chosen process fluid 210 could be used, including pumps of varying configurations and which can use particular liquids or gases and be air driven or electrically driven. In some examples, the pump 290 can be an air driven gas booster. In some examples, the pump 290 may operate with a pump fluid, which may be air or any other suitable fluid. In some examples, the pump may be a diaphragm pump.

In some examples, the pump 290 may circulate the pump fluid through a pump fluid circulation line 292. As shown in the example of FIG. 3, the pump fluid circulation line 292 can be configured with one or more valves, such as solenoid valves 235.1, 235.2, 235.3, and safety valve 238. As also shown in FIG. 3, the pump fluid circulation line 292 can be configured with one or more filters, such as pump fluid intake filter 283.

The circulation conduit 230 can include one or more valves configured to selectively restrict, allow, and reverse a direction of flow of the process fluid through the circulation conduit 230 and other portions of the recirculating extraction apparatus 200. In one example arrangement shown in FIG. 3, the system of valves can include thirteen valves, labeled 232.1, 232.2, 232.3, 232.4, 232.5, 232.6, 232.7, 232.8, 232.9, 232.10, 232.11, 232.12, 232.13, configured to selectively restrict, allow, and reverse a direction of flow of the process fluid through the circulation conduit 230 and other portions of the recirculating extraction apparatus 200. In some examples, the valves can be rated from about −22° F. to about 356° F.

In some examples, the circulation conduit 230 can be configured with a system of valves to selectively direct the process fluid to flow within the extraction vessel 210 for a desired time, for example, to allow the extraction process to be completed to a desired extent. In some examples, the recirculating extraction apparatus 200 can be configured with a system of valves to permit reversal of a direction of flow of the process fluid through the extraction vessel 210. In some examples, the reversal of the direction of flow of the process fluid through the extraction vessel 210 can facilitate cleaning or clearing of first and second extraction vessel filters 281 and 282 without interrupting ongoing extraction processing. In some examples, the system of valves can include one or more pairs of opposing valves for directing the flow of process fluid.

In the example apparatus depicted in FIG. 3, the process fluid can be directed in a first direction of flow such that the process fluid enters the extraction vessel 210 through extraction vessel opening 211, passing through extraction vessel filter 212. According to this direct direction of flow, the process fluid can pass through an interior portion of the extraction vessel 210 where it can come into contact with the source material, extract the extracted material, and form the mixture. The mixture can then be directed to exit the extraction vessel 210 at opening 213 and passing through filter 214. Optionally, the valves can be re-configured such that the direction of flow of the process fluid and/or mixture to be reversed, causing the process fluid and/or mixture to enter the extraction vessel 210 at extraction vessel opening 213, pass through extraction vessel filter 214, exit opening 211 and pass through filter 212.

As shown in FIG. 3, the recirculating extraction apparatus 200 can include one or more relief valves 237 to selectively allow the depressurization of fluid at one or more locations within the recirculating extraction apparatus 200. As shown in FIG. 3, the recirculating extraction apparatus 200 can include one or more regulating valves 236. As shown in FIG. 3, the recirculating extraction apparatus 200 can include one or more solenoid valves 235.

The circulation conduit 230 can include a separation portion 234 configured to receive the mixture and permit a portion of the extracted material to separate from the mixture within the separation chamber 220. In some examples, the separation portion 234 can allow the process fluid to decompress in the separation chamber 220 and separate the extracted material from the process fluid without the use of a valve or regulator for separation.

In some examples, the separation portion 234 can include an orifice. The orifice can be sized to match a flow rate of the process fluid. In some examples, the orifice can be about 0.010 inches in diameter. In some examples, the orifice can restrict the flow of process fluid, allowing a significant pressure drop in the mixture after passing through the orifice and allowing the process fluid to change from a subcritical or supercritical state to a gaseous state, thereby allowing the extracted material to fall out, or separate, from the process fluid.

In some examples, the separation portion 234 can be positioned near an inner wall of the separation chamber 220. In some examples, the separation portion 234 can be orientated to direct the process fluid along the inner wall of the separation chamber 220 in a generally rotational manner. In some examples, a portion of circulation conduit 230 leading to the separation portion 234 can be angled at an appropriate angle, which can be about 45°. In some examples, the inner wall of the separation chamber 220 can be relatively warmer than an interior portion of the separation chamber 220. In some examples, directing the process fluid along the inner wall of the separation chamber 220 in a generally rotational manner can help to keep the process fluid in a gaseous state after the process fluid is depressurized in the separation chamber 220. In such examples, the relatively warmer inner wall can help to counteract the Joule-Thompson cooling effect that can occur when the process fluid decompresses.

In some examples, the recirculating extraction apparatus 200 can be configured to receive the process fluid from a process fluid canister 205, which can be a cylinder or any other storage device capable of holding the process fluid.

In some examples, the extraction apparatus 210 can include a heating source 207 configured to heat the process fluid prior to ingress of the process fluid into the extraction vessel 210. In some examples, heating source 207 can heat the process fluid within a process fluid canister 205. The heating source can be a heating blanket, electric band heater, induction heater, coiled tubing with heating fluid in intimate contact, or an open flame.

In some examples, as the process fluid can be heated by the heating source 207, a temperature and the internal pressure of the process fluid rises. If necessary, the heating source 207 can deliver continuous or recurring heat to the process fluid so as to help maintain the pressure within the system.

Optionally, the temperature and internal pressure of the process fluid can be increased to the point of causing a phase transformation of the process fluid. Optionally, this phase transformation can occur within the process fluid canister 205. When the initial state of the process fluid is liquid or gas, increasing the temperature and pressure above the fluid's critical point will cause a phase change to a supercritical state. For example, heating carbon dioxide above about 87° F. at a pressure above about 1083 psi can result in a phase change to a supercritical state.

The initial state of the process fluid in the process fluid canister 205 can be solid, liquid, gaseous, or supercritical. Where the process fluid is in an initial liquid state, a siphon can be optionally used to remove the process fluid from a top opening of the process fluid canister while maintaining consistent pressure. Alternatively, the liquid process fluid can be removed by inverting the process fluid canister 205 such that the opening is on the bottom.

The recirculating extraction apparatus 200 can include a temperature regulator. The temperature regulator can include a temperature regulation fluid and a temperature regulation fluid circulation line 242. In the example shown in FIG. 3, the temperature regulator can include a chiller/heater 244 with temperature regulation fluid circulation line 242 running through the recirculating extraction apparatus 200 to regulate temperature of the process fluid in various locations of the recirculating extraction apparatus 200.

The temperature regulator can be configured to permit recirculation of the temperature regulation fluid. In some examples, the temperature regulation fluid can be liquid water, steam or another other heating/cooling fluids. The temperature regulation fluid circulation line 242 can run in close proximity to the circulation conduit 242. In some examples, the circulation line can form a coil around the temperature regulation fluid circulation line 242.

The temperature regulator can be configured to raise, lower, or maintain the temperature of the process fluid prior to introduction into the extraction vessel 210 to achieve a desired temperature. In some examples, the temperature regulator can be configured to optionally cause a phase change in the process fluid prior to entering the extraction vessel 210.

As shown in the example of FIG. 3, the temperature regulator can include a heat exchanger 246 configured to regulate temperature of the process fluid prior to ingress of the process fluid into the extraction vessel 210. In some examples, the heat exchanger 246 can be a tube-in-tube configuration, allowing the process fluid to be in close physical proximity to the temperature regulation fluid, thereby allowing for the exchange of heat between the two fluids while maintaining their separation from one another. Alternative configurations of the heat exchanger 246 could include a shell & tube design, a coil design, or any other method of heat exchange.

In some examples, a regenerative heat exchanger can be configured to help regulate the temperature of process fluid at the beginning and the end of the closed-loop recirculating system. In some examples, the regenerative heat exchanger can use heat generated from the compression of process fluid by the pump at the beginning of the cycle to offset Joule-Thompson cooling that can occur when the process fluid decompresses in the separation chamber.

In the example shown in FIG. 3, a regenerative heat exchanger 248 comprises two portions of the circulation conduit 230 running in close proximity to one another to transfer heat from a relatively warm portion of the circulation conduit 230 to a relatively cool portion of the circulation conduit 230. In some examples, the regenerative heat exchanger 248 can be a tube-in-tube configuration, allowing a relatively warm portion of the process fluid to be in close physical proximity to a relatively cool portion of the process fluid, thereby allowing for the exchange of heat between the two portions while maintaining their separation from one another. Alternative configurations of the heat exchanger 248 could include a shell & tube design, a coil design, or any other method of heat exchange.

In some examples, the temperature regulator can be configured to regulate the temperature of the process fluid within the extraction vessel 210. In some examples, temperature regulator can be configured to regulate the temperature of the process fluid within the separation chamber 220. As shown in the example of FIG. 3, the recirculating extraction apparatus 200 can include an extraction vessel temperature regulator 216, a separation chamber temperature regulator 226, and an overflow chamber temperaregulator 256. As shown in this example, the temperature regulation fluid circulation line 242 can extend to the extraction vessel temperature regulator 216, the separation chamber temperature regulator 226, and the overflow chamber temperature regulator 256 and allow the temperature regulation fluid to flow through each of these components. In some examples, the temperature regulators 216, 226, and 256 can be a heating/cooling jacket. Alternative configurations could include a shell & tube design, a coil design, or any other method of heat exchange.

In some examples, the temperature regulator can regulate the temperature of the process fluid in other portions of the circulation conduit 230. In one example, a portion of the circulation conduit 230 connecting the extraction vessel 210 with the separation chamber 220 could run in close proximity to the temperature regulation fluid circulation line 242. Alternative configurations could include a shell & tube design, a coil design, or any other method of heat exchange. Any other portion of the circulation conduit 230 could be regulated in the same ways.

In some examples, a collection cup 222 can be used to capture the extracted material after separation from the process fluid in the separation chamber 220.

In other examples, a valve, such valve 232.9 shown in FIG. 3, can be used to direct the extracted material out of the separation chamber 220 after separation from the process fluid while the separation chamber 220 remains under pressure.

As shown in FIG. 3, the recirculating extraction apparatus 200 can include one or more pressure gauges 271 to indicate a pressure of fluid at one or more locations within the recirculating extraction apparatus 200. As shown in FIG. 3, the recirculating extraction apparatus 200 can include one or pressure transducers 272 to sense a pressure of fluid at one or more locations within the recirculating extraction apparatus 200. As shown in FIG. 3, the recirculating extraction apparatus 200 can include one or more thermocouples 273 to sense a temperature of fluid at one or more locations within the recirculating extraction apparatus 200.

Figure 8:
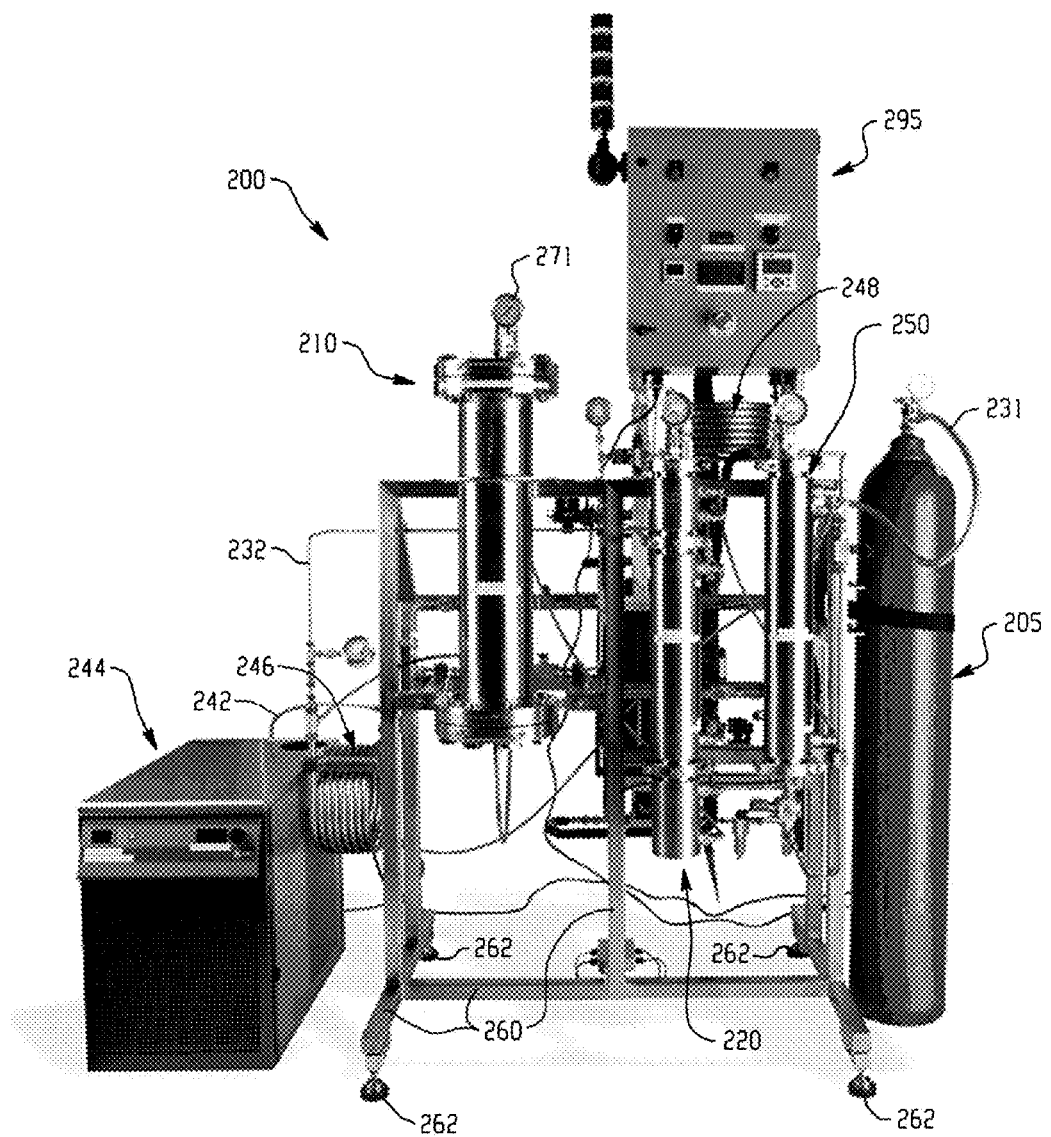
FIG. 8 is a perspective view of an extraction system.

In the example shown in FIG. 8, some of the described aspects of the recirculating extraction apparatus 200 are shown mounted on a frame 260 in an exemplary arrangement. In some examples, a system scale 262 can be incorporated into the apparatus 200 below the frame 260.

In some examples, the extraction apparatus 100 and recirculating extraction apparatus 200 can display system parameters such as temperature, pressure, and time. In some examples, the extraction apparatus 100 and recirculating extraction apparatus 200 can receive data on system parameters from one more sensors. For example, in the apparatus shown in FIG. 1, pressure can be displayed on pressure gauges 171. Optionally, pressure and other system parameters can be displayed on an electronic control panel or other suitable display mechanism. In the example shown in FIG. 3, a control panel could display pressure data received from sensor such as pressure gauges 271 and pressure transducers 272. The control panel could also display temperature data received from sensor such as thermocouples 173.

In some examples, various aspects of the operation of the extraction apparatus 100 and recirculating extraction apparatus 200 can be automated with a control system. The control system can include electronic components and mechanical components. In some examples, the control system can be configured to automate the operation of the system based upon data supplied by sensors or based upon the lapse of time. For example, in the device shown in FIG. 3, the control system could be configured to turn on or off the chiller/heater 244 or the pump 290, in response to data supplied by the sensors or the lapse of time. The system could also be configured to implement certain other logical operations helpful in system operation. For example, the control system can be configured to run certain operations for a certain elapsed period of time or based upon certain data received from sensors and thereafter perform a desired function or set of functions, such as open or close certain valves. In the example of FIG. 3, the control system could be configured to open or close any of valves 232.1 through 232.13, any of the relief valves 233, any of the solenoid valves 135, any of the regulating valves 136, and any of the safety valves 138.

In the example shown in FIG. 8, the apparatus 200 can have a control box 295 that can include either or both of the control panel and control system. The control box could be electrically connected to the various sensors and system components of the apparatus 200.

Examples, of methods of operating the system disclosed in FIG. 3 will now be disclosed. As an initial state, the system can be confirmed to be clean.

The extraction vessel 210 can be opened with the following steps. Close valves 232.1 and 232.2. Open valves 232.3 and 232.4. Remove bolts on the top of the extraction vessel 210, for example using a 1.5" impact socket and impact wrench. Lift the flange and allow it to rest in the open position on the stops.

The extraction vessel 210 can be loaded with source material, optionally with a funnel to avoid spillage. The source material can be prepared in a desired fashion. For example, the source material could be ground, gently compressed, or otherwise prepared. The system scale 262 can be used to weigh the amount of source material loaded.

Once the desired amount of source material is loaded, the extraction vessel can be closed and sealed. In some examples, the sealing surfaces can be checked to be clean and generally free of debris. In some examples, O-rings can be inspected for any visible damage or defects and replaced as necessary. In some examples, the O-rings do not require lubrication. In some examples, an extraction vessel flanges 213 and 214 can be closed and closure bolts 217 installed.

The recirculating extraction apparatus 200 can be evacuated of moisture or other fluids. The following valves can be opened: 232.1, 232.2, 232.3, 232.5, 232.10, 232.11, 232.12, and 232.13. A pump can be connected to valve 232.10 and the system pumped down to a desired pressure, for example 20-25 in. Hg. This pressure can be held for several minutes to ensure no gross leaks and to remove moisture. All valves can be closed and the pump disconnected from valve 232.10.

Process fluid can be filled according to the following steps. Tare the scale by pushing a "tare/reset" key. Open a valve on the process fluid canister 205. Open valves 232.1, 232.3, 232.5, and 232.7. Pressurize and fill extraction vessel 210 by slowly opening valve 232.13. Extraction vessel 210 can be pressurized from both top and bottom. Allow extraction vessel 210 pressure to equalize with the pressure in the process fluid canister 205. Shut valves 232.5 and 232.13. Pressurize the separation chamber 220 and overflow chamber 250 to 300 psi by opening valve 232.12 and throttling valve 232.11. Close valve 232.11 when pressure in the separation chamber 220 and overflow chamber 250 is approximately 300 psi. Increase extraction vessel 210 pressure by turning the switch to "START" on control panel. Once extraction vessel 210 pressure has reached desired pressure, open valve 232.6. Shut valve 232.12. Open valve 232.11. Allow system to stabilize for approximately 5 minutes.

At this stage in the example method, the system can be now circulating process fluid 210 and begin extracting. It may be necessary to adjust the amount of process fluid 210 in the system to maintain a desired extraction pressure. To increase pressure in the extraction vessel 201, the following steps can be performed. Shut valve 232.11. Open valve 232.12 until extraction vessel 210 reaches the desired pressure or the separation chamber 220 or overflow chamber 250 reach 450 psi. Shut valve 232.12. Open valve 232.11. Allow the system to stabilize, and repeat as necessary. To decrease pressure in the extraction vessel 210, the following steps can be performed. Shut one of valves 232.1 and 232.5 (only one of them will be open). Throttle valve 232.13 and allow the extraction vessel pressure to decrease to a desired level. Shut valve 232.13. Open one of valves 232.1 or 232.5 (whichever was previously opened).

In the example shown in FIG. 3, the process fluid 210 can flow through the circulation conduit 230 according to the following path: (1) out of the left side of the pump 290, (2) down to the regenerative heat exchanger 248, (3) up and over to the heat exchanger 246, (4) through the extraction chamber 210, (5) through the safety valve 238, (6) through the separation portion 234 within in the separator chamber 220, (7) to the regenerative heat exchanger 248, (8) through the overflow chamber 250, (9) through filters 284 and 285, and (10) back up to the pump 290.

In the example shown in FIG. 3, the temperature regulation fluid can flow through the temperature regulation fluid circulation line according to the following path: (1) out of the chiller/heater 244, (2) through the temperature heat exchanger 246, (3) through the extraction vessel temperature regulator 216, (4) through the separation chamber temperature regulator 226, (5) through the overflow chamber temperature regulator 226, and (6) back up to the chiller/heater 244.

In some examples, a control system can be equipped with a timer that will automatically shut down the system after a set amount of time has elapsed. The timer can be adjusted at any time during the extraction. Actual time elapsed can be displayed.

In some examples, a flow of the process fluid within in the extraction vessel 210 can be reversed during operation. For example, to back flush a clogged filter, to prevent channeling through the source material, or both. In some examples, one or more of the extraction vessel filters 281 or 282 can be back-flushed when a differential pressure greater than 300 psi exists between the extraction vessel 210 pressure and either the pressure at either of the extraction vessel openings 211 or 212.

According to some examples, a first direction of flow through the extraction vessel 210 can be reversed according to the following steps. Open valve 232.5. Open valve 232.2. Shut valve 232.1. Shut valve 232.6.

According to some examples, following a first reversal of direction of the process fluid, a second direction of flow through the extraction vessel 210 can be reversed according to the following steps. Open valve 232.1. Open valve 232.6. Shut valve 232.5. Shut valve 232.2.

According to some examples, the separation portion 234 may include an orifice and an orifice filter. The orifice and orifice filter can be unclogged according to the following steps. Shut valve 232.2 and valve 232.6 (only one of them will be open). Allow the pump 290 to draw the process fluid out of the separation chamber 220 and overflow chamber 250 and transfer the process fluid to the extraction vessel 210. Optionally, a portion of the process fluid can be transferred back to the process fluid canister 205 by shutting valves 232.1 and 232.5, throttling valve 232.14 to direct pump output to the process fluid canister, then shutting valve 232.13 and re-opening valve 1 or 5.

Continuing with the example method for unclogging an orifice and orifice filter, when the separation chamber 220 and overflow chamber 250 reach approximately 70 psi, the pump can be configured to automatically turn off Shut valve 232.11. Open valve 232.10 to relieve any residual pressure in the separation chamber 220 and overflow chamber 250. Remove the separation chamber top flange 213. Remove the orifice and orifice filter. Clean the orifice and the orifice filter by soaking them in acetone or methanol and blowing them out with compressed air. Verify the orifice is clear by looking through it.

Continuing with the example method for unclogging the orifice and orifice filter, after cleaning the orifice and orifice filter, reassemble the orifice and filter using tape, for example tape having a polytetrafluoroethylene coating such as Teflon® supplied by DuPont. Use caution to prevent excess Teflon tape from getting into the orifice. Tighten the orifice assembly such that the orifice points toward the separation chamber inner wall. Replace the separation chamber top flange 213 and tighten the clamp bolts 217 to about 20 ft-lbs. Close valve 232.10. Open valve 232.12. Pressurize separation chamber 220 and overflow chamber 250 to about 300 psi by opening valve 12 and throttling valve 232.11. Close valve 232.11 when separator pressure is approximately 300 psi. In some examples, the pump can be configured to automatically re-start when separator vessel pressure is above about 70 psi. Open valve 232.2 or valve 232.6 (whichever valve was previously opened) to restart the extraction. Shut valve 12. Open valve 232.11. Increase or decrease extractor vessel pressure as described above.

Once the extraction is complete to a desired extent, the process fluid can be recovered according to the following method. Increase the temperature of the chiller/heater 244 to at least about 110° F. Open valve 232.6 and shut valve 232.2 (they may already be in this position). Shut valve 1 and valve 5 (only one of them will be open). Open valve 232.13 slowly to allow flow into the process fluid canister 205. When separation chamber 220 pressure is less than about 200 psi, shut valve 232.6 and open valves 232.2 and 232.8. In some examples, the pump 290 can be configured to shut down automatically when separation chamber pressure reaches about 70 psi. Close process fluid canister valve. Vent remaining process fluid out of the system by opening valves 232.10, 232.1 and 232.4 and allow residual pressure in the system to vent. The system can now be powered down, or new source material can be loaded and the extraction process started again.

In some examples, the orifice can be sized such that a flow rate of the process fluid into the separation chamber 220 matches a flow rate of the process fluid from the pump 290. In examples, in which the process fluid is supercritical carbon dioxide, the following system parameters and orifice sizes can be used. Chiller/heater temperature: about 110° F. to about 120° F. Extraction vessel pressure: about 1200 psi to about 1400 psi. Orifice size: Size #15 orifice for about 30 cubic feet per minute (CFM) air flow (about 7.5 horse power (HP) air compressor); Size #15 orifice for about 60 CFM air flow (about 15 HP air compressor); Size #25 orifice for about 100 CFM air flow (about 25 HP air compressor). Weight of CO2 in system: approximately 12 pounds for about 5 L extraction vessel systems and about 30 pounds for about 20 L extraction vessel systems. Separation chamber and overflow chamber pressure: about 350 psi to about 400 psi. Separation chamber and overflow chamber temperature: about 70° F. to about 80° F.

In examples, in which the process fluid is subcritical carbon dioxide, the following system parameters and orifice sizes can be used. Chiller/heater temperature: about 60° F. to about 70° F. Extraction pressure: about 1100 psi to about 1400 psi. Orifice size: size #10 orifice for about 30 CFM air flow (about 7.5 HP air compressor); size #15 orifice for about 60 CFM air flow (about 15 HP air compressor); size #20 orifice for about 100 CFM air flow (about 25 HP air compressor). Weight of CO2 in system: approximately 17 pounds for the about 5 L extraction vessel systems and about 45 pounds for the about 20 L extraction vessel systems. Separation chamber and overflow chamber pressure: about 250 psi to about 300 psi. Separation chamber and overflow chamber temperature: about 20° F. to about 30° F.

In Subcritical CO2 operation, the extraction vessel 210 can be full of liquid CO2. In such examples, CO2 can be added to the system after extraction has begun in order to maintain a desired extraction pressure.

An example of a fractional extraction apparatus that includes dual-phase recirculation of the process fluid will now be discussed in connection FIGS. 9(A), 9(B), and 9(C), which depict portions 0.1, 0.2, and 0.3, respectively, of the exemplary fractional extraction apparatus.

As shown in these figures, a circulation conduit 930, which may include flexible portions 931, connects various components of the fractional extraction apparatus, including process fluid canisters 905, first and second extraction vessels 910.1 and 910.2, first, second, and third separation chambers 920.1-920.3, an overflow chamber 950, a gas pump 990, and a liquid pump 995.

The extraction vessels can each have two extraction vessel openings, each with extraction vessel filters. The filters can be 20 micron standard or any other suitable size.

The first extraction vessel 910.1 is shown with first extraction vessel filter opening 911.1 and second extraction vessel opening 912.1. The second extraction vessel 910.2 is shown with first extraction vessel filter opening 911.2 and second extraction vessel opening 912.2.

Multiple extraction vessel configurations may be used. For example, 5 liter, 20 liter, two 5 liter, or two 20 liter extraction vessels. In some examples, the 5 liter extraction vessel holds up to 3 pounds of dry, grounded source material. In some examples, the 20 liter extraction vessel holds up to 12 pounds of dry, ground material. In some examples, the extraction vessel does not need to be full in order to perform an extraction. In some examples, the extraction vessel is rated for a maximum pressure of 5000 psi (344 bar). In some examples, the extraction vessel is rated for a maximum temperature of 160 degrees Fahrenheit (71 degrees Celsius). In some examples the extraction vessel is made of 304 stainless steel (A2 stainless steel). In some examples the extraction vessel interior is polished to food grade level. In some examples, the extraction vessel openings have threaded closures. In some examples the extraction vessel openings have a sealing mechanism, which can be a self-energized o-ring seal, Buna-90. In some examples, the extraction vessel can include a non-isolable spring loaded safety relief valve to prevent accidental over-pressurization.

The gas pump 990 can be configured to receive the process fluid in a gaseous state and compress the process fluid. In some examples, gas pump 990 can be configured to receive the process fluid at a pressure of about 400 psi and compress the process fluid to about psi.

In some examples, an air driven gas booster with a flow rate of 15 CFM can be used to help recirculate the process fluid in connection with the apparatuses disclosed herein. In some examples, the air driven gas booster can have all wetted parts made of 316 stainless steel. In some examples, the air driven gas booster can include a coalescing filter on its inlet to prevent oil introduction. In some examples, a non-isolable spring loaded safety relief valve can be used to prevent accidental over-pressurization.

The liquid pump 995 can be configured to receive the process fluid in a liquid state and compress the process fluid. In some examples, liquid pump 995 can be configured to receive the process fluid at a pressure of about 400 psi and compresses it to about 5,000 psi. In other examples, liquid pump 995 can be configured to compress the process fluid to about 1,500 psi. The liquid pump 995 could be configured to compress the process fluid to any other predetermined pressure for which the liquid pump 995 is capable in order to extract a predetermined extracted material from a particular source material.

Multiple separation chamber configurations may be used. For example, the separation chambers may be 5 liter or 2.5 liter separation chambers. In some examples, the separation chambers 920.1-920.3 may be rated for a maximum pressure of 600 psi (41 bar) and a maximum temperature of 160 degrees Fahrenheit (71 degrees Celsius). In some examples, the separation chambers 920.1-920.3 may be made of 304 stainless steel. In some examples, the separation chambers 920.1-920.3 may have closures that are of FDA sanitary style bolted. In some examples, the separation chambers 920.1-920.3 may have a sealing mechanism that is a sanitary gasket of cured silicone. In some examples, the separation chambers 920.1-920.3 may have non-isolable spring loaded safety relief valves to prevents accidental over-pressurization. In some examples, the separation chambers 920.1-920.3 may have features for facilitating the collection and/or removal of the separated extracted material as shown in previous examples. For example, a cup or a vent may be used to remove the extracted material from the separation chamber.

Figure 9A:
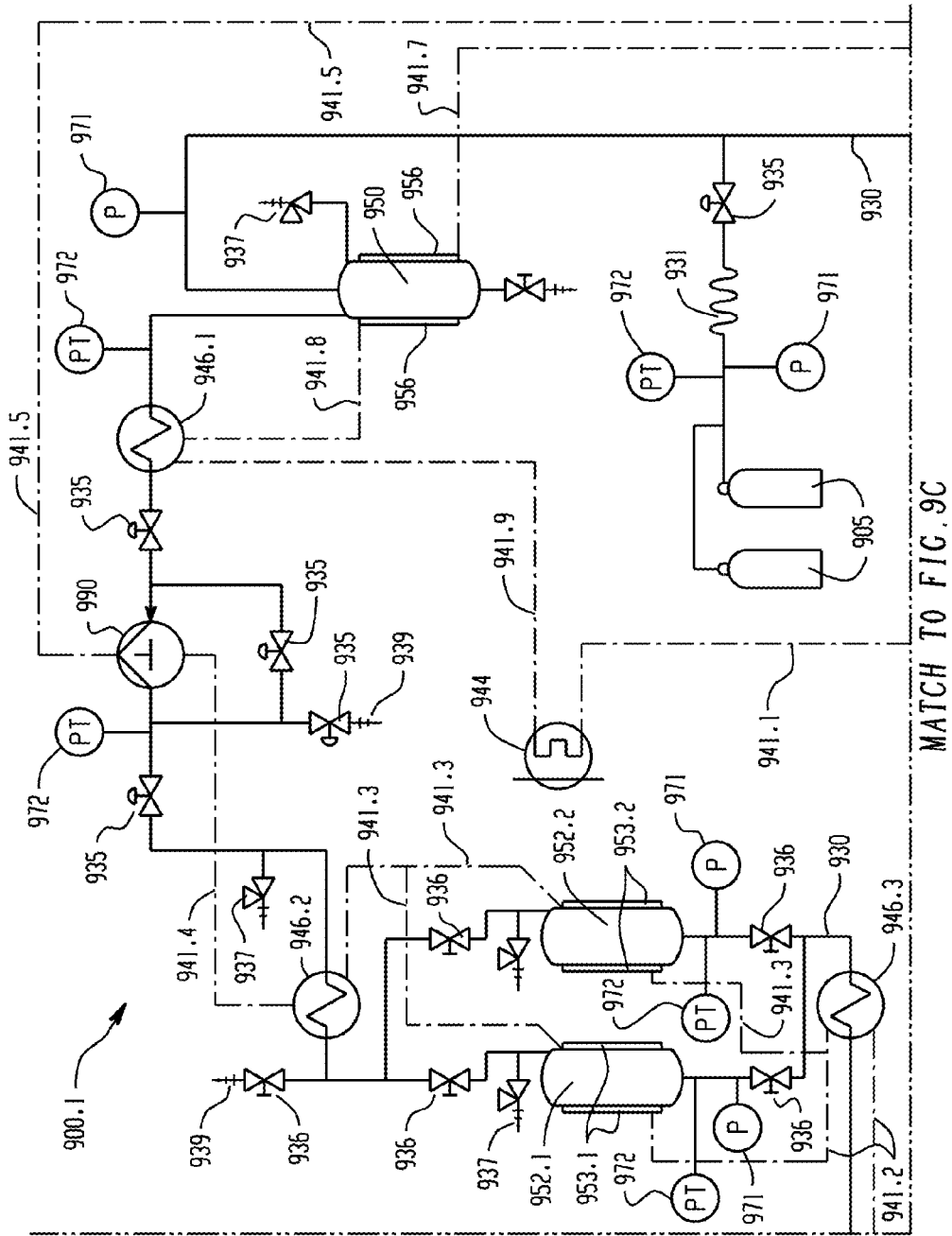
FIG. 9(A) is a schematic diagram of first portion of a fractional extraction apparatus.
Figure 9B:
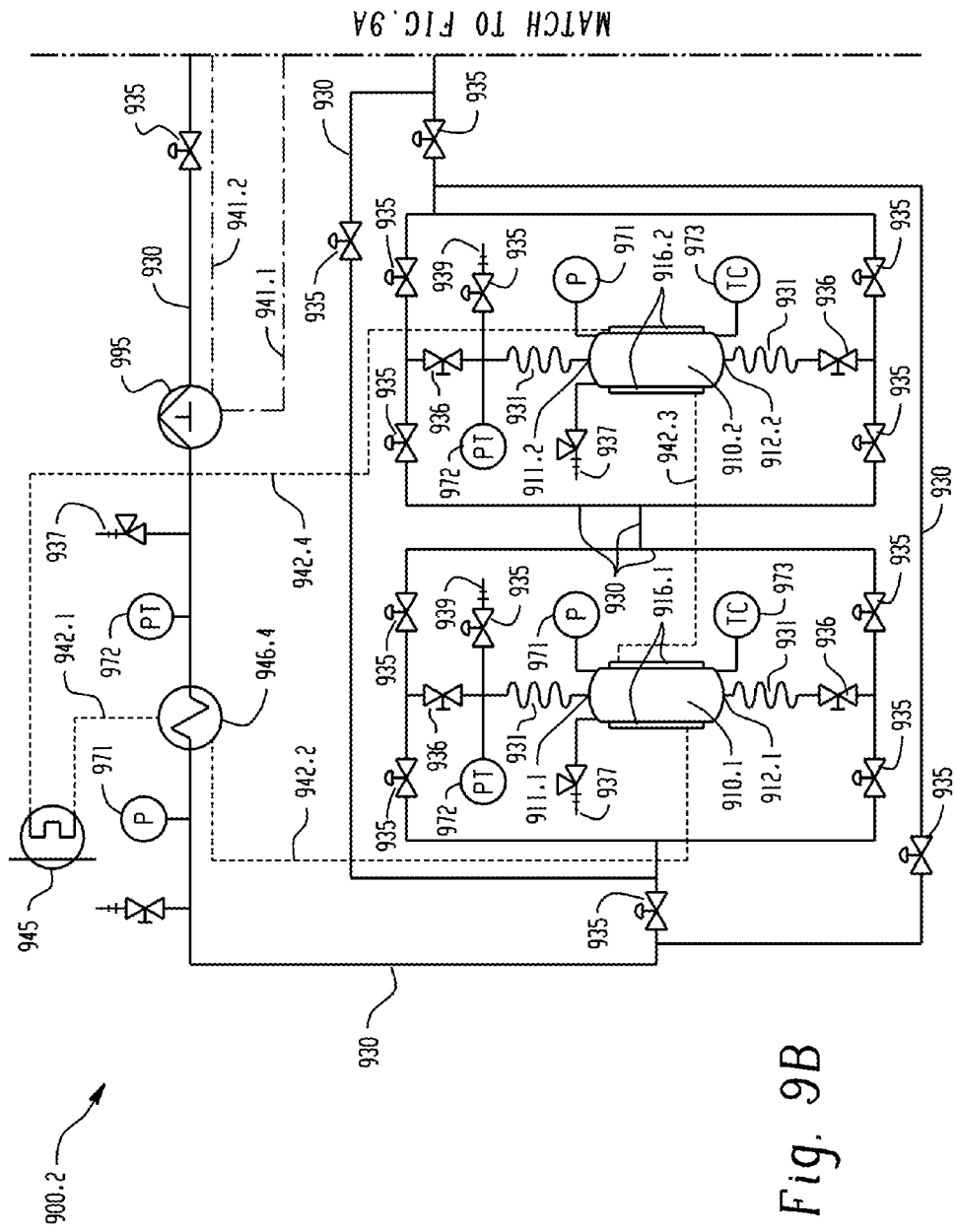
FIG. 9(B) is a schematic diagram of second portion of a fractional extraction apparatus.
Figure 9C:
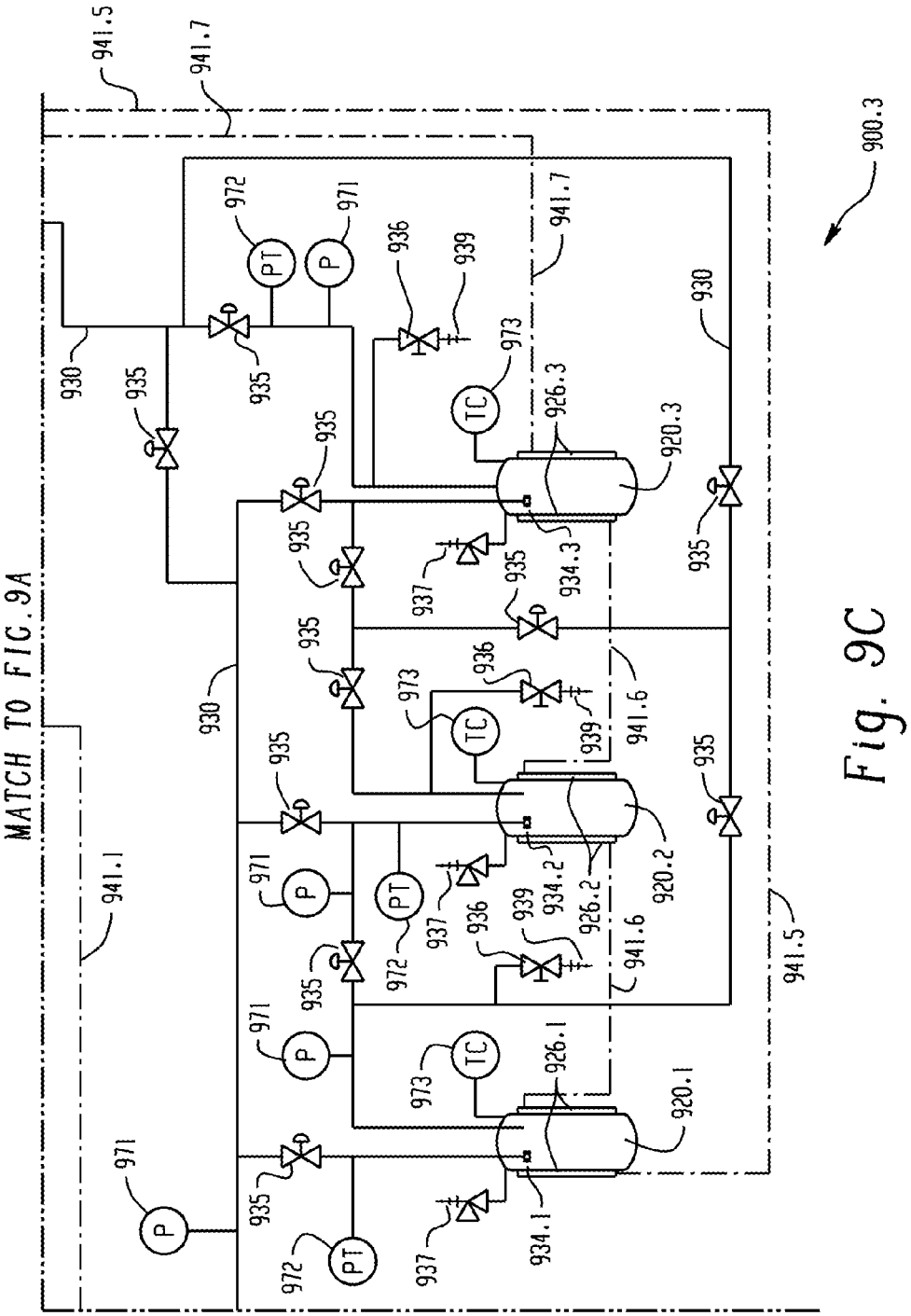
FIG. 9(C) is a schematic diagram of third portion of a fractional extraction apparatus.

As shown in the figures with consistent symbols throughout FIGS. 9(A), 9(B), and 9(C), various air operated valves 935, manual valves 936, relief valves 937, vents 939, may be connected to the circulation conduit 930. As also shown in the figures with consistent symbols throughout FIGS. 9(A), 9(B), and 9(C), various pressure gauges 971 (marked with a "P" in the figures), pressure transducers 972 (marked with a "PT" in the figures), thermocouples 973 (marked with a "TC" in the figures), are shown connected to the circulation conduit 930 and other components of the fractional extraction apparatus.

As discussed in previous examples, the circulation conduit can be configured by manipulating the various valves to selectively direct a process fluid into or out of either of the first or second openings of an extraction vessel, passing through an extraction vessel filter at each opening, and may be reversibly directed. As discussed in previous examples, the process fluid can come into contact with a source material within the extraction vessel to form a mixture. As discussed in previous examples, the circulation conduit can be configured by manipulating the various valves to selectively allow and reversibly direct flow of the mixture into or out of the first or second extraction vessel openings while allowing continuous flow of the mixture to the separation chamber.

In the example configuration shown in FIG. 9B the circulation conduit 930, air operated valves 935, and manual valves 936, may be configured to selectively allow or reversibly directed flow of the process fluid or a mixture into or out of any of the extraction vessel openings shown in FIB 9B or to any of the separation chambers shown in FIG. 9C.

In this example, the process fluid can be directed into a predetermined extraction vessel, i.e. either first extraction vessel 910.1 or second extraction vessel 910.2, through a predetermined opening of the predetermined extraction vessel, i.e. openings 911.1, 912.1 and their associated filters, in the case of first extraction vessel 910.1 or, in the case of second extraction vessel 910.2, openings 911.2 or 912.2 and their associated filters. The mixture formed by the process fluid and source material within the predetermined extraction vessel can then be directed out of either of the two openings of the predetermined extraction vessel and can either be selectively directed to any of the openings of the two extraction vessels, including back into the opening it just exited, or to any of the three separation chambers 920.1, 920.2, and 920.3 shown in FIG. 9C.

As also discussed in connection with previous examples, the circulation conduit 930 can include a separation portion. In the example shown in FIG. 9C, first, second, and third separation portions, 934.1, 934.2, and 934.3, are respectively located within first, second, and third separation chambers 920.1, 920.2, and 920.3. As discussed in connection with previous examples, each separation portion 934.1, 934.2, or 934.3 can be configured to receive the mixture and permit a portion of the extracted material to separate from the mixture within the separation chamber 920.1, 920.2, and 920.3. In some examples, the separation portion can allow the process fluid to decompress in the separation chamber and separate the extracted material from the process fluid without the use of a valve or regulator for separation.

As discussed in previous examples, the separation portion 934.1, 934.2, or 934.3 can include an orifice. The orifice can be sized to match a flow rate of the process fluid. In some examples, the orifice can restrict the flow of process fluid, allowing a significant pressure drop in the mixture after passing through the orifice and allowing the process fluid to change from a subcritical or supercritical state to a gaseous state, thereby allowing the extracted material to fall out, or separate, from the process fluid.

In some examples, the separation portion 934.1, 934.2, or 934.3 can be positioned near an inner wall of the separation chamber 920.1, 920.2, or 920.3. In some examples, the separation portion 934 can be orientated to direct the process fluid along the inner wall of the separation chamber 920 in a generally rotational manner. In some examples, a portion of circulation conduit 930 leading to the separation portion 934.1, 934.2, or 934.3 can be angled at an appropriate angle, which can be about 45°. In some examples, the inner wall of the separation chamber 920.1, 920.2, or 920.3 can be relatively warmer than an interior portion of the separation chamber 920.1, 920.2, or 920.3. In some examples, directing the process fluid along the inner wall of the separation chamber 920.1, 920.2, or 920.3 in a generally rotational manner can help to keep the process fluid in a gaseous state after the process fluid is depressurized in the separation chamber 920.1, 920.2, or 920.3. In such examples, the relatively warmer inner wall can help to counteract the Joule-Thompson cooling effect that can occur when the process fluid decompresses.

As discussed in previous examples, the fractional extraction apparatus can include a temperature regulator for regulating the temperature of the process fluid. In the example shown in FIG. 9B, the temperature regulator includes a chiller/heater 945 connected to a temperature regulation line with portions 0.1-0.4 configured to recirculate a temperature regulation fluid, for example water or another fluid. In some examples, the chiller/heater can have a temperature range of −10 degrees Celsius to 70 degrees Celsius (14 degrees Fahrenheit to 158 degrees Fahrenheit).

A fourth conduit heat exchanger 946.4 is connected to the temperature regulation line. Extraction vessel heat exchangers 916.1 and 916.2, for example heating/cooling jackets, are also connected to portions of the temperature regulation line, and are configured to assist in the regulation of the process fluid within the extraction vessels 910.1 and 910.2 respectively.

The temperature regulator can also be configured to selectively cause the process fluid to change state. For example, by heating high pressure gaseous process fluid at fourth conduit heat exchanger 946.4, the temperature regulator can cause the process fluid to change from a gaseous state to a supercritical state.

The temperature regulator shown in FIG. 9B can facilitate the regulation of the process fluid during extraction to a predetermined temperature. In concert with the configuration of other system components, including the compression of the process fluid to a predetermined pressure by gas pump 995, and the size opening of the separation portion 934.1, 934.2, or 934.3, the fractional extraction apparatus can be configured to create a predetermined temperature and pressure of the process fluid within one or both extraction vessels 910.1 and 910.2 to remove a predetermined extracted material from the source material. Alternatively, the disclosed fractional extraction apparatus can be configured to create a different predetermined temperature and a different predetermined pressure of the process fluid to remove a different predetermined extracted material from the source material.

In some examples, a first predetermined extracted material may have a relatively light molecular weight, such as a volatile oil. The pressure and temperature necessary to remove such a first predetermined extracted material may be relatively lower than other extractable materials of the source material. In some examples of some source materials and some predetermined extracted materials, it may be desirable to perform extraction using a minimum pressure or temperature in order to best preserve or avoid undue degradation of the source material or predetermined extracted material.

In some examples, the fractional extraction apparatus may be operated by extracting a first predetermined extracted material at a first predetermined temperature and pressure. Following this processing, the fractional extraction apparatus may be operated by extracting a second predetermined extracted material at a second predetermined temperature and pressure.

The example fractional apparatus of FIGS. 9(A), (B), and (C) also includes features for recirculating the process fluid through the various system components, as in previous examples.

The example fractional apparatus also includes a recirculation thermal manager. As shown, the recirculation thermal manager may include a cooling source, such as the chiller 944 shown in FIG. 9A, a thermal management line, such as the thermal management line portions 941.1-941.9 shown in shown in FIGS. 9(A), 9(B), and 9(C), a thermal management fluid, which could be water or another fluid, and at least one heat exchanger. In the example of FIGS. 9(A), 9(B), and 9(C), first, second, and third conduit heat exchangers 946.1, 946.2, and 946.3, first, second, and third separation chamber heat exchangers 926.1, 926.2, and 926.3, an overflow chamber heat exchanger 956, and first and second storage tank heat exchangers 953.1 and 953.2 are shown.

An example of the operation of the thermal manager could include the chiller 944 cooling the thermal management fluid, which is then directed through the first thermal management line portion 941.1 to a liquid pump heat exchanger of the liquid pump 995, through the second thermal management line portion line 941.2, to the third conduit heat exchanger 946.3, through portions of the third thermal management line portion 941.3 and one or more of the first and second storage tank heat exchangers 953.1 or 953.2 to the second conduit heat exchanger 946.2, through the forth thermal management line portion 941.4 to a gas pump heat exchanger of the gas pump 990, through the fifth thermal management line portion 941.5 to the first separation chamber heat exchangers 926.1, through the sixth thermal management line portion 941.6 to the second and third separation chamber heat exchangers 926.2 and 926.3, through the seventh thermal management line portion 941.7, to the overflow heat exchanger 956, through the eighth thermal management line portion 941.8 to the first conduit heat exchanger, through the ninth thermal management line portion 941.9 to the chiller 944.

In this way, the recirculation thermal manager can be configured to allow recirculation of the thermal management fluid and to manage the temperature of the process fluid. In some examples, the thermal manager can manage the temperature of the process fluid within various system components in a regenerative fashion by having a cooling effect on some components and a heating effect on other components. For example, the operation of the fractional extraction apparatus, including the thermal manager, can have a cooling effect upon the liquid pump 995, first and second storage tanks 952.1 and 952.2, and gas pump 990 as the thermal management fluid is circulated through the respective heat exchangers of each component. The operation of the gas pump 990 can cause the thermal management fluid in the gas pump heat exchanger to heat such that thermal management fluid circulated from the gas pump 990 through the fifth thermal management line portion 941.5 is relatively warmer than the thermal management fluid flowing to gas pump 990 through the fourth thermal management line portion 941.4. The circulation of the relatively warmer thermal management fluid to the separation chambers 920.1, 920.2, and 920.3 and the overflow chamber 950 can have a warming effect on these components as the thermal management fluid is circulated through the respective heat exchangers of each component.

Likewise, operation of the separation chambers 920.1, 920.2, and 920.3 can cause the thermal management fluid in the separation chamber heat exchangers 926.1, 926.2, and 926.3 to cool such that thermal management fluid circulated from the separation chambers 920.1, 920.2, and 920.3 through the seventh thermal management line portion 941.7 is relatively cooler than the thermal management fluid flowing to the separation chamber heat exchangers 926.1, 926.2, and 926.3 through the fifth thermal management line portion 941.5.

The recirculation thermal manager can also be configured to selectively cause the process fluid to change state. For example, by cooling gaseous process fluid at second conduit heat exchanger 946.2, the thermal manager can cause the process fluid to change from a gaseous state to a liquid state.

Extraction vessel openings can include filter plug assemblies for retaining the extraction vessel filters. Aspects of an example filter plug assembly is shown in FIGS. 10-15.

Figure 10A:
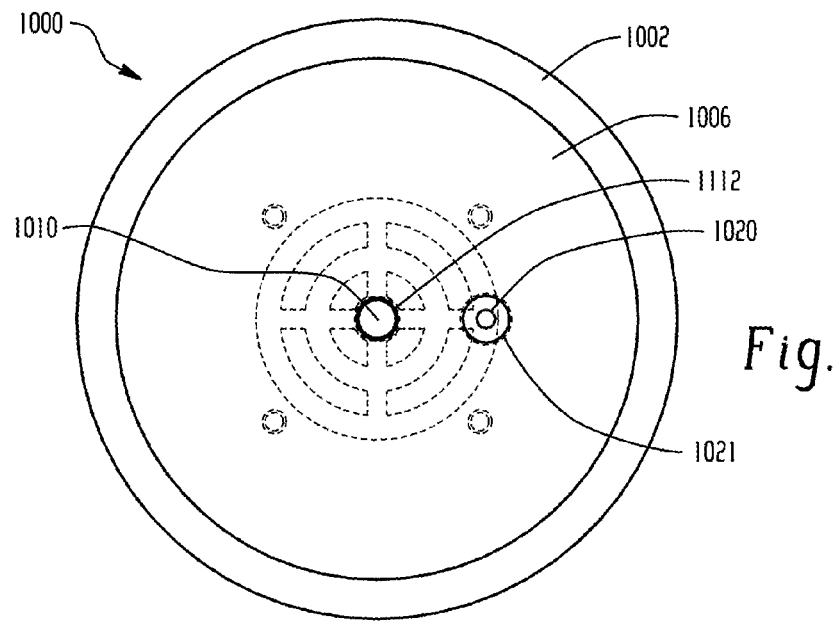
FIG. 10(A) is a top view of a filter plug base.

FIG. 10(A) shows a top view of a filter plug base 1000. A second base surface 1006 and an outer flange surface 1002 are shown. A second base surface flow channel opening 1112 of a flow channel 1010 is shown near the center of the second base surface 1006. The flow channel 1010 extends through the base to a first base surface. An instrument cavity 1020 with a second base surface instrument cavity opening 1021 are also shown. The instrument cavity 1020 extends through the base to a first base surface.

Figure 10B:
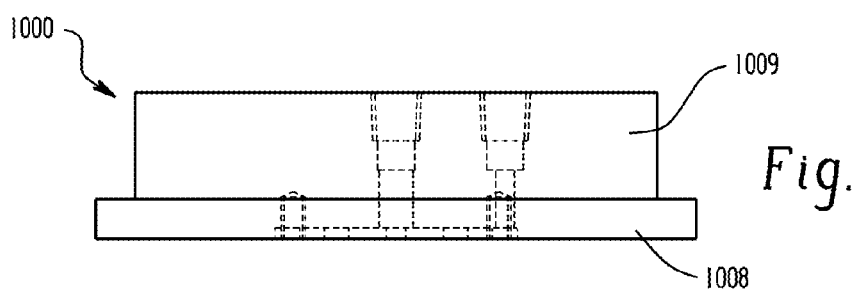
FIG. 10(B) is a side view of a filter plug base.

FIG. 10(B) is a side view of a filter plug base, including a base side 1009 and an outer flange side 1008.

Figure 10C:
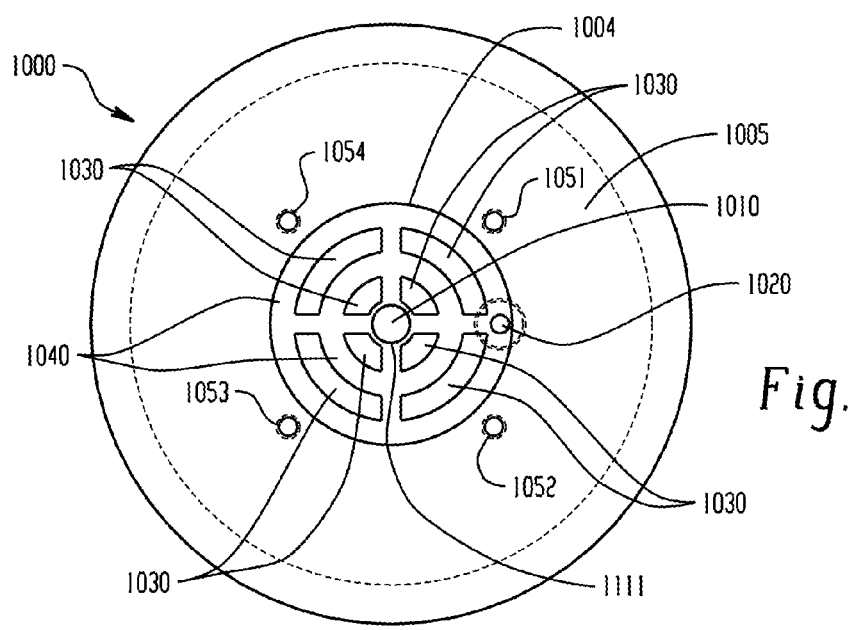
FIG. 10(C) is a bottom view of a filter plug base.

FIG. 10(C) is a bottom view of a filter plug base with a first base surface 1005 and an inset area 1004. In the example shown, several raised portions 1030 form base surface flow channels 1040 within the inset area 1004. Other configurations of raised portions 1030 and/or base surface flow channels 1040 may alternatively be used.

The flow cavity 1010 with first base surface flow cavity opening 1111 is shown within the base surface flow channels 1040 near the center of the inset area 1004. The instrument cavity 1020 is also shown within the base surface flow channels 1040 near the perimeter of the inset area 1004. First, second, third, and fourth base fastener holes, 1051, 1052, 1053, and 1054 are shown on the first base surface 1005. For example base fastener holes 1051, 1052, 1053, and 1054 could be threaded screw holes in some embodiments.

Figure 10D:
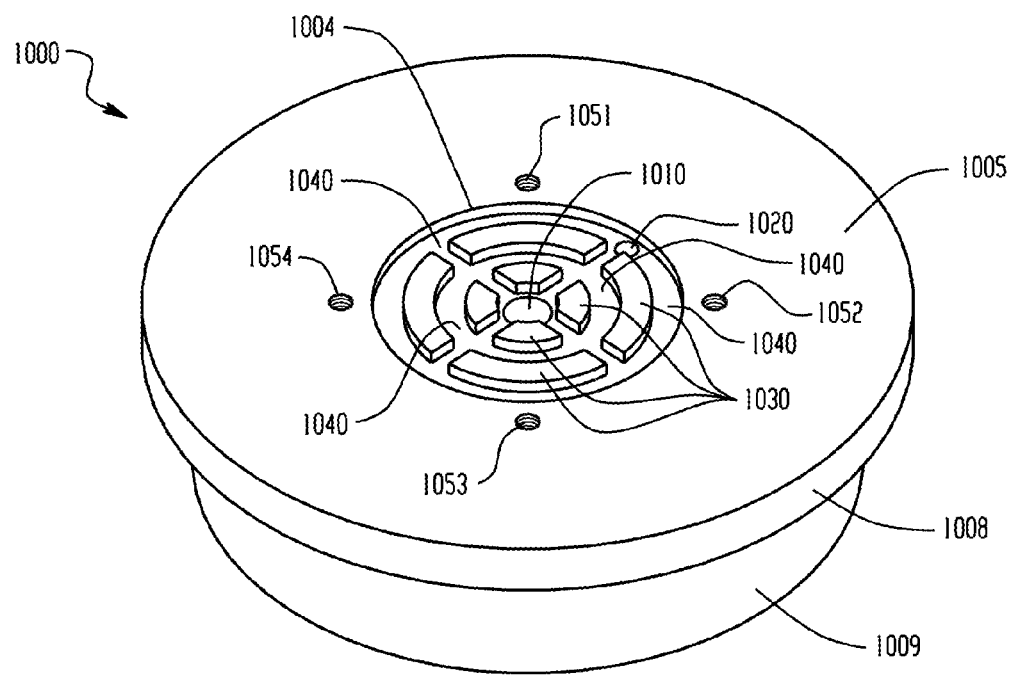
FIG. 10(D) is a perspective view of a filter plug base.

A perspective view of a bottom orientation of the base 1000 is shown in FIG. 10D.

Figure 11:
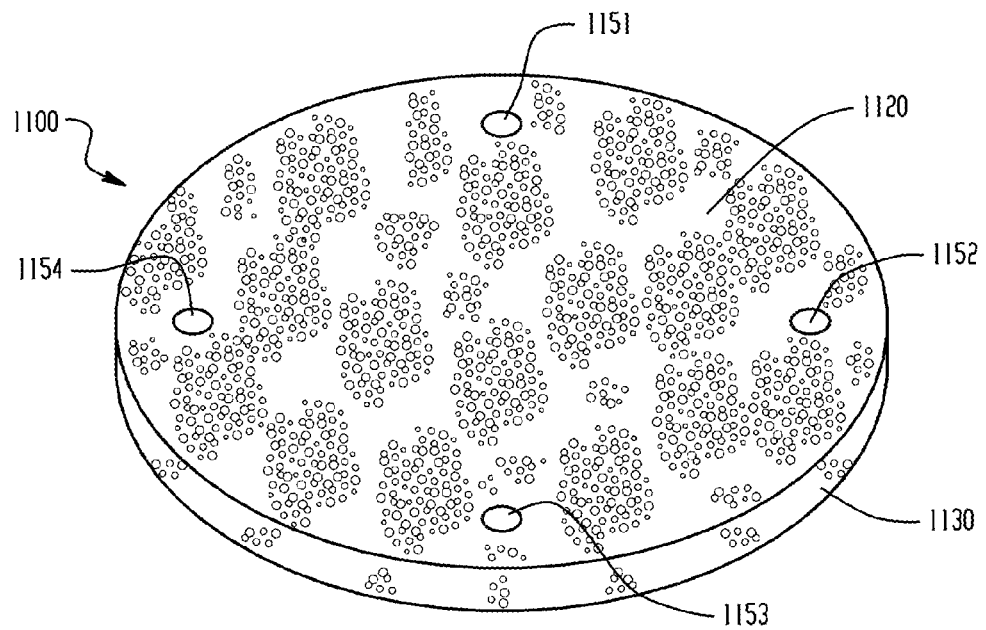
FIG. 11 is a perspective view of a filter.

FIG. 11 is a perspective view of a filter 1100 with a filter surface 1120, a filter side 1130, and first, second, third, and fourth filter fastener holes 1151, 1152, 1153, and 1154. In some examples, the filter may be made of a metal mesh. In some examples, the filter may be a 20 micron standard filter.

Figure 12:
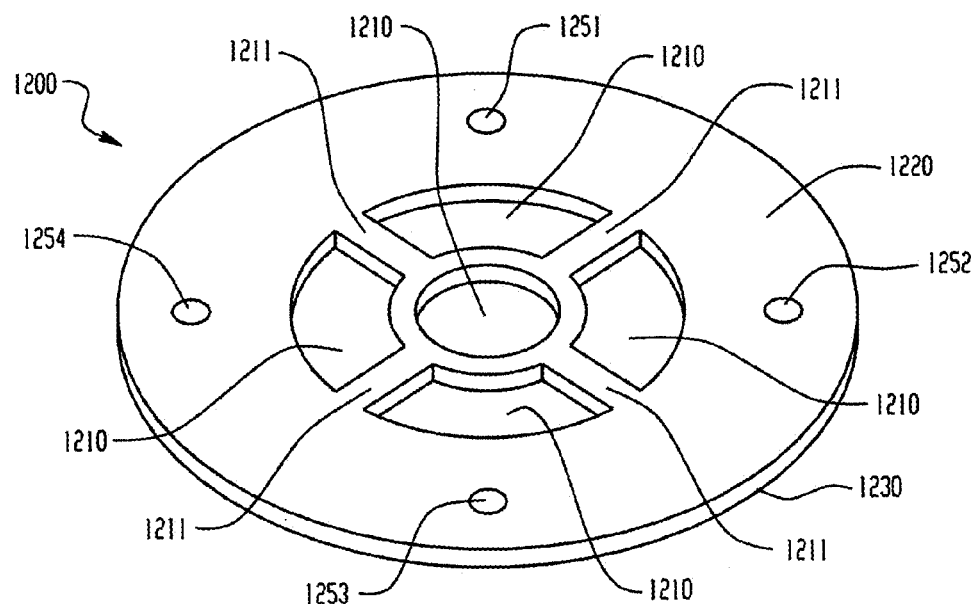
FIG. 12 is a perspective view of a filter retaining piece.

FIG. 12 is a perspective view of a filter retaining piece 1200. As shown, the filter retaining piece 1200 includes a filter retaining piece surface 1220 with filter retaining piece surface interior portions 1211 forming filter retaining piece flow holes 1210. Other configurations of filter retaining piece surface interior portions 1211 and/or filter retaining piece flow holes 1210 may alternatively be used. First, second, third, and fourth filter retaining piece fastener holes are shown at 1251, 1252, 1253, and 1254. The filter retaining piece side is labeled 1230.

Figure 13:
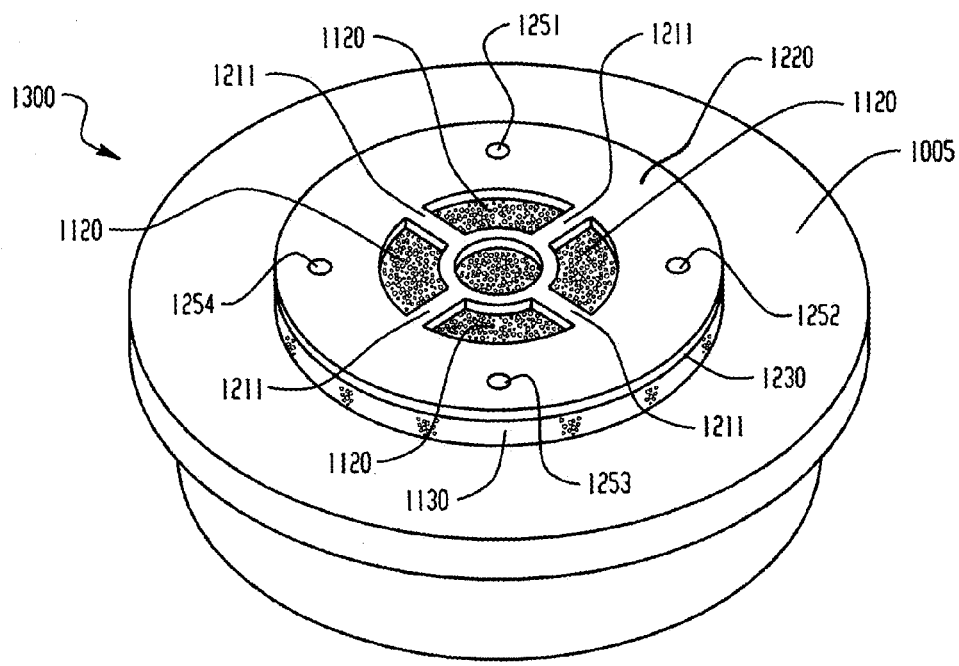
FIG. 13 is a perspective view of a filter plug subassembly.

FIG. 13 is a perspective view of a filter plug sub-assembly 1300 wherein the filter 1100 and filter retaining piece 1200 are attached to the base 1000 with the fastener holes of each aligned so that a fastener, for example, screws, could be inserted through the holes to releasably secure the filter plug sub-assembly 1300. In the example shown, the filter may be held firmly in place between the base and filter retaining piece regardless of which direction fluid is passed through it.

Figure 14A:
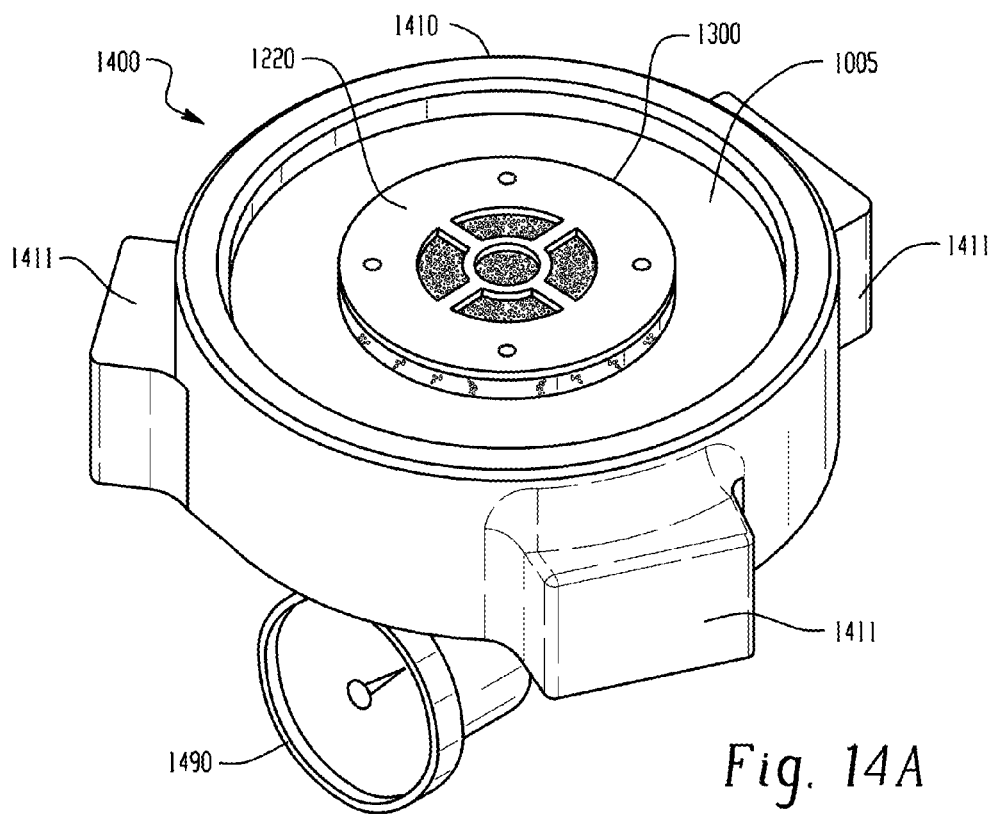
FIG. 14(A) is a perspective of a filter plug assembly and instrument.
Figure 14B:
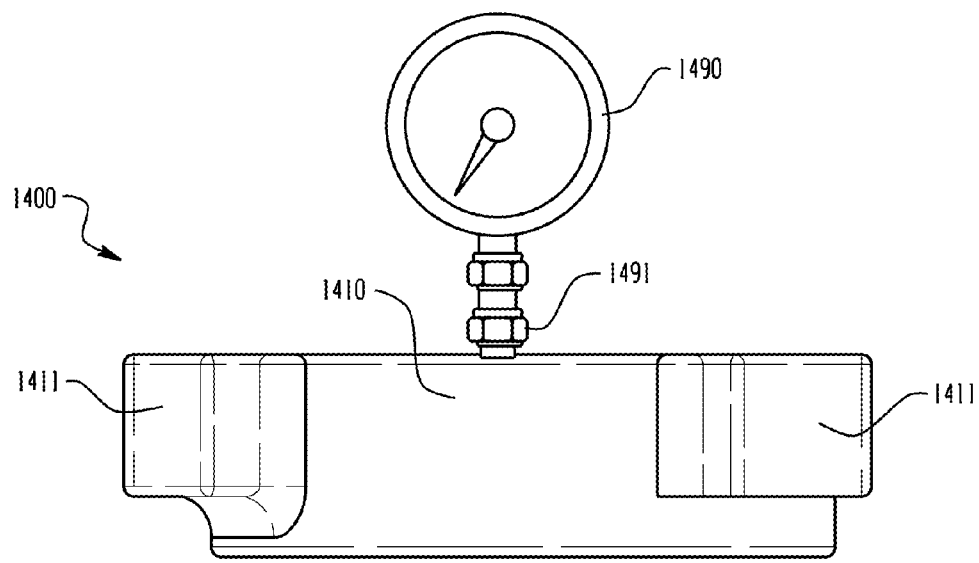
FIG. 14(B) is a side view of a filter plug assembly and instrument.

FIGS. 14(A) and 14(B) show perspective and side views of a filter plug assembly 1400 and instrument 1490 in an exemplary configuration. In the example shown, the filter plug sub-assembly is enclosed by an extraction vessel fastener 1410. For example, extraction vessel fastener 1410 can be a commercially available threaded hammer union nut, shown in the figures with prongs 1411. One of ordinary skill in the art could use any other available means for mechanically attaching the filter plug sub-assembly 1300 to the extraction vessel opening 1511.

Figure 15:
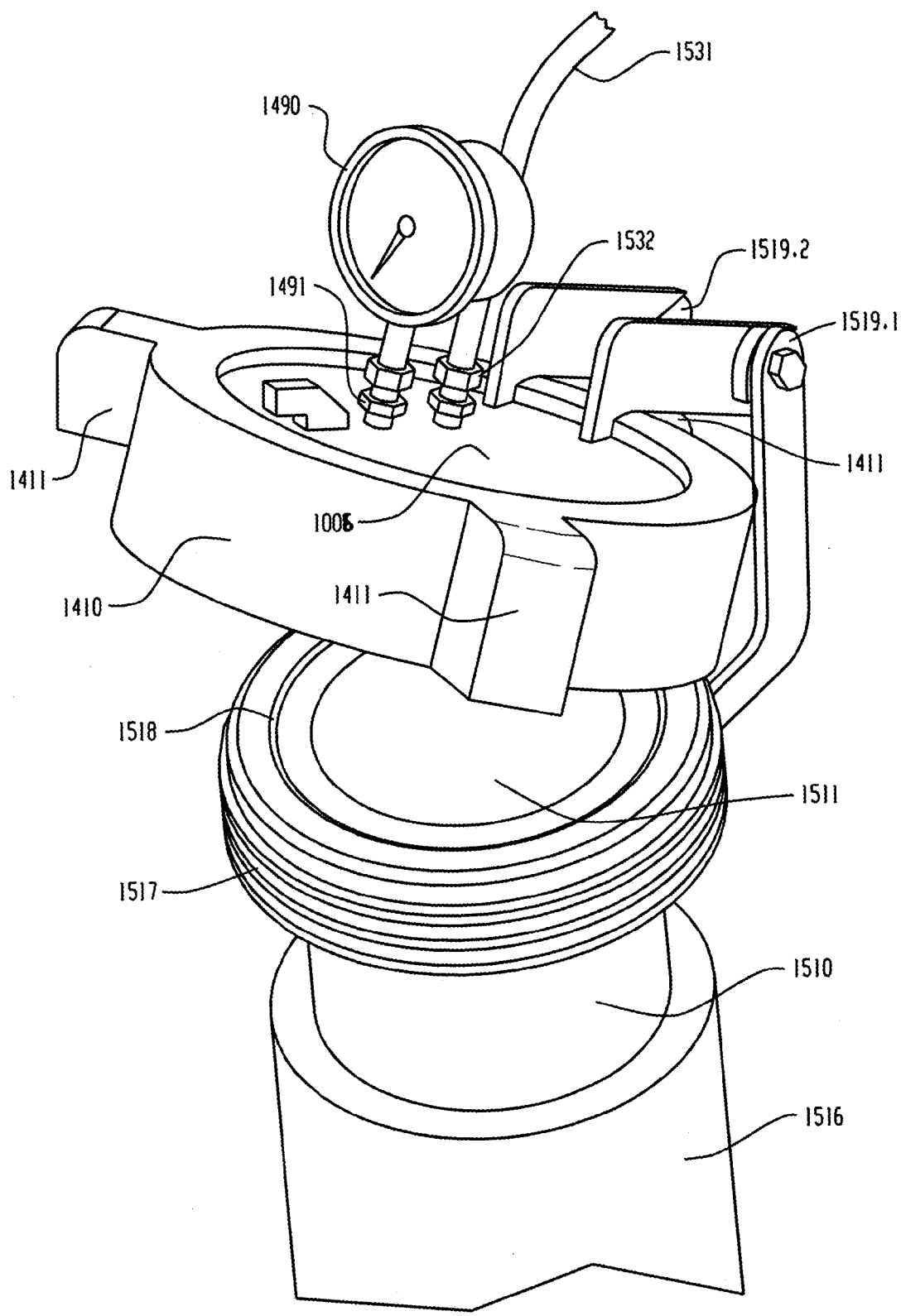
FIG. 15 is a perspective of a of a filter plug assembly and instrument, process fluid conduit, and extraction vessel.

FIG. 15 is a perspective of a filter plug assembly 1400, instrument 1490, flexible portion 1531 of the circulation conduit, and extraction vessel 1510 with extraction vessel heat exchanger 1516. The flexible portion 1531 of the circulation conduit can be attached to the second base surface 1006 at conduit connection 1532. The instrument can be attached to the second base surface 1006 at instrument connection 1491. In some examples, the instrument 1490 can be a pressure gauge configured to sense the pressure of a fluid within the base surface channel 1040 by communicating with the instrument cavity 1020. In some examples, the instrument 1490 can be a thermocouple configured to sense the temperature of a fluid within the base surface channel 1040 by having a thermocouple stem that extends through the instrument cavity 1020 to the base surface channel 1040.

In the combination shown in FIG. 15, the extraction vessel 1510 has an opening 1511 with a sealing area 1518, which may be a lip or groove or other suitable location for a Buna-90 O-Ring or other suitable sealing device. The extraction vessel 1510 can have a threaded end portion 1517 suitable for fastening with the extraction vessel fastener 1410.

In the example shown, hinges 1519.1 and 1519.2 can facilitate the opening and closing of the extraction vessel. In some examples, an upper prong portion of each of the hinges 1519.1 and 1519.2 is securely fastened to the second base surface 1006 while a bottom portion of each of the hinges 1519.1 and 1519.2 is securely fastened to the outside of the extraction vessel 1510. For example, the hinges 1519.1 and 1519.2 could be welded to the second base surface 1006 and the extraction vessel 1510. In some examples, the extraction vessel fastener 1410 is free to rotate, for example to screw onto or off of the threaded end portion, while the hinges 1519.1 and 1519.2 remain attached to the second base surface 1006 and extraction vessel 1510.

Numerical ranges and parameters set forth approximations of the broad scope of the disclosed systems and methods. The numerical values set forth in the specific examples, are reported as precisely as possible. Any numerical value, however, inherently contains certain errors necessarily resulting from the standard deviation found in their respective testing measurements.

Furthermore, while the devices, systems, methods, and so on have been illustrated by describing examples, and while the examples, have been described in considerable detail, it is not the intention of the applicant to restrict, or in any way, limit the scope of the appended claims to such detail. It is, of course, not possible to describe every conceivable combination of components or methodologies for purposes of describing the devices, systems, methods, and so on provided herein. Additional advantages and modifications will readily appear to those skilled in the art. Therefore, the invention, in its broader aspects, is not limited to the specific details and illustrative examples, shown and described. Accordingly, departures can be made from such details without departing from the spirit or scope of the applicant's general inventive concept. Thus, this application is intended to embrace alterations, modifications, and variations that fall within the scope of the appended claims. The preceding description is not meant to limit the scope of the invention. Rather, the scope of the invention is to be determined by the appended claims and their equivalents.

Directional terms such as "up", "down", "left", "right", "over", "top, "bottom", "front", and "side", are meant to reference the representations shown in figures and are not meant to restrict the particular arrangement of the various elements in the claimed apparatus or method.

Finally, to the extent that the term "includes" or "including" is employed in the detailed description or the claims, it is intended to be inclusive in a manner similar to the term "comprising," as that term is interpreted when employed as a transitional word in a claim. Furthermore, to the extent that the term "or" is employed in the claims (e.g., A or B) it is intended to mean "A or B or both." When the applicant intends to indicate "only A or B, but not both," then the term "only A or B but not both" will be employed. Similarly, when the applicant intends to indicate "one and only one" of A, B, or C, the applicant will employ the phrase "one and only one." Thus, use of the term "or" herein is the inclusive, and not the exclusive use.

The invention claimed is:

1. A fractional extraction apparatus, comprising:
    an extraction vessel having a first extraction vessel opening and a second extraction vessel opening, the extraction vessel configured to receive a process fluid through either of the first or a second extraction vessel openings, allow the process fluid to come into contact with a source material within the extraction vessel under either of a selectively configured first predetermined pressure and a first predetermined temperature to remove a first predetermined extracted material from the source material to form a first mixture or a second predetermined pressure and a second predetermined temperature to remove a second predetermined extracted material from the source material to form a second mixture;
    a first filter configured to retain the source material while also allowing the process fluid and the first or second mixture to pass through the first extraction vessel opening;
    a second filter configured to retain the source material while also allowing the process fluid and the first or second mixture to pass through the second extraction vessel opening;
    a separation chamber;
    an overflow chamber;
    a circulation conduit configured to selectively direct the process fluid into or out of either of the first or second extraction vessel openings, selectively allow and reversibly direct flow of the first or second mixture into or out of the first or second extraction vessel openings while allowing continuous flow of the first or second mixture from the extraction vessel to the separation chamber, allow a portion of the first or second predetermined extracted material to separate from the first or second mixture within the separation chamber, allow the process fluid to flow from the separation chamber to the overflow chamber, and allow recirculation of the process fluid to the extraction vessel through either of the first or second extraction vessel openings to allow the process fluid to come into contact with the source material within the extraction vessel; and
    an extraction temperature regulator including a heating/cooling source, a temperature regulation fluid, a temperature regulation line, and at least one heat exchanger, the temperature regulator configured to allow recirculation of the temperature regulation fluid and to regulate the temperature of the process fluid.

2. The fractional extraction apparatus of claim 1 wherein the circulation conduit includes a separation portion configured to allow the first or second mixture to decompress and separate the process fluid from a portion of the first or second predetermined extracted material within the separation chamber without the use of a valve or regulator for achieving separation.

3. The fractional extraction apparatus of claim 2 comprising at least one additional extraction vessels as recited in claim 1.

4. The fractional extraction apparatus of claim 3 comprising at least one additional separation chambers.

5. The fractional extraction apparatus of claim 4 comprising at least two storage tanks connected to the circulation conduit between the overflow chamber and the extraction vessels.

6. The fractional extraction apparatus of claim 5 in which the circulation conduit is configured to selectively direct the process fluid into or out of a predetermined extraction vessel among the at least two extraction vessels, selectively allow and reversibly direct flow of the first or second mixture into or out of the first or second extraction vessel openings of the predetermined extraction vessel while allowing continuous flow of the first or second mixture from the predetermined extraction vessel to a predetermined separation chamber among the at least two separation chambers, allow a portion of the first or second predetermined extracted material to separate from the first or second mixture within the predetermined separation chamber, direct flow of the process fluid to the overflow chamber, direct flow of the process fluid to a predetermined storage tank among the at least two storage tanks, and allow recirculation of the process fluid to a predetermined extraction vessel among the at least two extraction vessels.

7. The fractional extraction apparatus of claim 6 including a filter plug assembly, the filter plug assembly comprising:
 a base having a first base surface with at least one base surface channel, the base surface channel including a flow cavity opening of a flow cavity extending through the base to a second base surface, the base surface channel further including an instrument cavity opening of an instrument cavity extending through the base to the second base surface;
 a filter retaining piece;
 a filter fastener for releasably securing the filter retaining piece to the base while holding the filter between the filter retaining piece and the base and forming a filter plug sub-assembly;
 an extraction vessel fastener for releasably securing the filter plug sub-assembly to the first or second extraction vessel opening such that an instrument connected to the instrument cavity may sense a condition of the process fluid or mixture within the filter plug sub-assembly without contacting the source material within the extraction vessel.

8. The fractional extraction apparatus of claim 7 wherein the temperature regulator includes at least one heating source, at least one cooling source, and at least one heat exchanger configured to regulate the temperature of the process fluid.

9. The fractional extraction apparatus of claim 8 further comprising
 a gas pump connected the circulation conduit and configured to receive the process fluid in a gaseous state and compress the process fluid;
 a liquid pump connected to the circulation conduit and configured to receive the process fluid in a liquid state and compress the process fluid;
 a recirculation thermal manager including a cooling source, a thermal management fluid, a thermal management line, and at least one heat exchanger, the recirculation thermal manager configured to allow recirculation of the thermal management fluid, to manage the temperature of the process fluid, and to selectively cause the process fluid to change from a gaseous state to a liquid state.

10. The fractional extraction apparatus of claim 9 wherein the at least one heat exchangers include at least one heat exchanger selected from the following: a conduit heat exchanger, an extraction vessel heat exchanger, a separation chamber heat exchanger, an overflow chamber heat exchanger, a storage tank heat exchanger, a gas pump heat exchanger, and an air pump heat exchanger.

11. The fractional extraction apparatus of claim 10 wherein the extraction vessel temperature regulation fluid and the thermal management fluid are water.

12. The fractional extraction apparatus of claim 1 wherein the apparatus is supported by a frame, the frame incorporating weight sensors mounted below the frame.

13. The fractional extraction apparatus of claim 12 including a process fluid canister, the canister having weight sensors mounted below a base of the canister.

14. A dual-phase recirculating extraction apparatus, comprising:
 an extraction vessel configured to receive a process fluid through either of a first or a second extraction vessel opening and allow the process fluid to come into contact with a source material within the extraction vessel to form a mixture;
 a first filter adapted to retain the source material while also allowing the process fluid and the mixture to pass through the first extraction vessel opening;
 a second filter adapted to retain the source material while also allowing the process fluid and the mixture to pass through the second extraction vessel opening;
 a separation chamber;
 an overflow chamber;
 a circulation conduit configured to selectively direct the process fluid into or out of either of the first or second extraction vessel openings, selectively allow and reversibly direct flow of the mixture into or out of the first or second extraction vessel openings while allowing continuous flow of the mixture from the extraction vessel to the separation chamber, allow a portion of the extracted material to separate from the mixture within the separation chamber, allow the process fluid to flow from the separation chamber to the overflow chamber, and allow recirculation of the process fluid to the extraction vessel through either of the first or second extraction vessel openings;
 a gas pump connected the circulation conduit and configured to receive the process fluid in a gaseous state and compress the process fluid;
 a liquid pump connected the circulation conduit and configured to receive the process fluid in a liquid state and compress the process fluid;
 an extraction temperature regulator including a heating/cooling source, a temperature regulation fluid, a temperature regulation line, and at least one heat exchanger, the temperature regulator configured to allow recirculation of the temperature regulation fluid and to regulate the temperature of the process fluid; and
 a recirculation thermal manager including a cooling source, a thermal management fluid, a thermal management line, and at least one heat exchanger, the recirculation thermal manager configured to allow recirculation of the thermal management fluid, to manage the temperature of the process fluid, and to selectively cause the process fluid to change from a gaseous state to a liquid state.

15. The dual-phase recirculating extraction apparatus of claim 14 wherein the circulation conduit includes a separation portion configured to allow the mixture to decompress and separate the process fluid from a portion of the predetermined extracted material within the separation chamber without the use of a valve or regulator for achieving separation.

16. The dual-phase recirculating extraction apparatus of claim 15 wherein the at least one heat exchangers include at least one heat exchanger selected from the following: a conduit heat exchanger, an extraction vessel heat exchanger, a separation chamber heat exchanger, an overflow chamber heat exchanger, a storage tank heat exchanger, a gas pump heat exchanger, and an air pump heat exchanger.

17. The dual-phase recirculating extraction apparatus of claim 16 wherein the extraction vessel temperature regulation fluid and the thermal management fluid are water.

18. The dual-phase recirculating extraction apparatus of claim 17, comprising at least one additional extraction vessels as recited in claim 1.

19. The dual-phase recirculating extraction apparatus of claim 18 comprising at least one additional separation chambers.

20. The dual-phase recirculating extraction apparatus of claim 19 comprising at least two storage tanks connected to the circulation conduit between the overflow chamber and the extraction vessels.

21. The dual-phase recirculating extraction apparatus of claim 20 in which the circulation conduit is configured to selectively direct the process fluid into or out of a predetermined extraction vessel among the at least two extraction vessels, selectively allow and reversibly direct flow of the mixture into or out of the first or second extraction vessel openings of the predetermined extraction vessel while allowing continuous flow of the mixture from the predetermined extraction vessel to a predetermined separation chamber among the at least two separation chambers, allow a portion of the extracted material to separate from the first or second mixture within the predetermined separation chamber, direct flow of the process fluid to the overflow chamber, direct flow of the process fluid to a predetermined storage tank among the at least two storage tanks, and allow recirculation of the process fluid to a predetermined extraction vessel among the at least two extraction vessels through either of the first or second extraction vessel openings.

22. The dual-phase recirculating extraction apparatus of claim 21 wherein the apparatus is supported by a frame, the frame incorporating weight sensors mounted below the frame.

23. The dual-phase recirculating extraction apparatus of claim 22 including a process fluid canister, the canister having weight sensors mounted below a base of the canister.

24. The dual-phase recirculating extraction apparatus of claim 23 including a filter plug assembly, the filter plug assembly comprising:
a base having a first base surface with at least one base surface channel, the base surface channel including a flow cavity opening of a flow cavity extending through the base to a second base surface, the base surface channel further including an instrument cavity opening of an instrument cavity extending through the base to the second base surface;
a filter retaining piece;
a filter fastener for releasably securing the filter retaining piece to the base while holding the filter between the filter retaining piece and the base and forming a filter plug sub-assembly;
an extraction vessel fastener for releasably securing the filter plug sub-assembly to the first or second extraction vessel opening such that an instrument connected to the instrument cavity may sense a condition of the process fluid or mixture within the filter plug sub-assembly without contacting the source material within the extraction vessel.

* * * * *